United States Patent
Sameshima et al.

(10) Patent No.: US 10,589,528 B2
(45) Date of Patent: Mar. 17, 2020

(54) LIQUID DISCHARGE HEAD, METHOD FOR PRODUCING THE SAME, LIQUID DISCHARGE APPARATUS, AND IMAGE FORMING APPARATUS

(71) Applicants: Tatsuya Sameshima, Kanagawa (JP); Hisashi Habashi, Kanagawa (JP); Ryota Chiba, Saitama (JP)

(72) Inventors: Tatsuya Sameshima, Kanagawa (JP); Hisashi Habashi, Kanagawa (JP); Ryota Chiba, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/289,152

(22) Filed: Feb. 28, 2019

(65) Prior Publication Data

US 2019/0283427 A1 Sep. 19, 2019

(30) Foreign Application Priority Data

Mar. 15, 2018 (JP) .................................. 2018-047519

(51) Int. Cl.
*B41J 2/16* (2006.01)
*C08K 5/37* (2006.01)
(Continued)

(52) U.S. Cl.
CPC ........... *B41J 2/1623* (2013.01); *B41J 2/1433* (2013.01); *B41J 2/14233* (2013.01);
(Continued)

(58) Field of Classification Search
CPC ....... B41J 2/1623; B41J 2/14233; C08K 5/37; C08K 5/101; C08K 5/3445; C08K 5/544;
(Continued)

(56) References Cited

U.S. PATENT DOCUMENTS 8,485,639 B2 * 7/2013 Lee .......................... B41J 2/161
29/890.1
9,205,652 B2 12/2015 Sameshima et al.
(Continued)

FOREIGN PATENT DOCUMENTS

JP  2001-113696  4/2001
JP  2013-151093  8/2013

*Primary Examiner* — An H Do
(74) *Attorney, Agent, or Firm* — Oblon, McClelland, Maier & Neustadt, L.L.P.

(57) ABSTRACT

A liquid discharge head including: a flow path formation part in which pressure generation chambers are arranged; and a pressure generation unit configured to apply pressure to the pressure generation chambers, wherein the pressure generation unit is formed by joining a vibration unit to the flow path formation part with a resin layer, and wherein the resin layer includes a curable resin composition including (A) an epoxy resin, (B) a polythiol compound, (C) at least one adhesiveness-imparting agent selected from the group consisting of a compound represented by General Formula (1), a titanium compound represented by General Formula (2-1), and a titanium compound represented by General Formula (2-2), and (D) a curing accelerator.

[General Formula (1)]

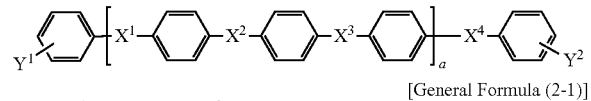

[General Formula (2-1)]

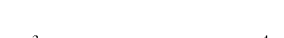

[General Formula (2-2)]

$(R^3O)_{\overline{3}}$—Ti—O—Ti—$(OR^4)_3$ (Continued)

-continued

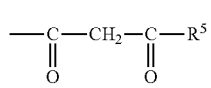

[General Formula (2-3)]

10 Claims, 5 Drawing Sheets

(51) Int. Cl.
   C08K 5/101    (2006.01)
   C08K 5/3445   (2006.01)
   B41J 2/14     (2006.01)
   C08K 5/544    (2006.01)
   C08L 63/00    (2006.01)

(52) U.S. Cl.
   CPC ........... B41J 2/14274 (2013.01); B41J 2/161 (2013.01); B41J 2/1606 (2013.01); B41J 2/1612 (2013.01); B41J 2/1632 (2013.01); B41J 2/1643 (2013.01); C08K 5/101 (2013.01); C08K 5/3445 (2013.01); C08K 5/37 (2013.01); C08K 5/544 (2013.01); C08L 63/00 (2013.01); B41J 2002/14362 (2013.01); B41J 2202/03 (2013.01); C08K 2201/014 (2013.01)

(58) Field of Classification Search
   CPC ... C08G 59/5073; C08G 59/66; C08G 59/245
   USPC .................................. 347/44, 54, 68, 70, 71
   See application file for complete search history.

(56) References Cited

U.S. PATENT DOCUMENTS 9,463,623 B2    10/2016  Takagi et al.
9,757,944 B2    9/2017   Takagi et al.
10,144,799 B2*  12/2018  Ogawa ................... C08G 59/66
2013/0187991 A1 7/2013   Watanabe

* cited by examiner

LIQUID DISCHARGE HEAD, METHOD FOR PRODUCING THE SAME, LIQUID DISCHARGE APPARATUS, AND IMAGE FORMING APPARATUS

CROSS-REFERENCE TO RELATED APPLICATIONS

The present application claims priority under 35 U.S.C. § 119 to Japanese Patent Application No. 2018-047519 filed Mar. 15, 2018. The contents of which are incorporated herein by reference in their entirety.

BACKGROUND OF THE INVENTION

Field of the Invention

The present disclosure relates to a liquid discharge head, a method for producing the liquid discharge head, a liquid discharge apparatus, and an image forming apparatus.

Description of the Related Art

A liquid discharge head includes nozzles configured to discharge liquid droplets, a liquid chamber in communication with the nozzles, and a pressure generation unit configured to apply pressure to liquid in the liquid chamber. The liquid discharge head is formed by joining a flow path substrate for forming flow path of, for example, the liquid chamber and a nozzle plate including the nozzles, with an adhesive agent.

For example, there has been proposed a liquid discharge head, where the liquid discharge head includes: a case head fixed on a flow path unit; and a piezoelectric element unit, the piezoelectric element unit including: a fixing member one surface of which is made to adhere with a first adhesive agent and a second adhesive agent; and a piezoelectric element that is fixed on the other surface intersecting with the one surface of the fixing member and is joined to a region facing a pressure generation chamber of a flow path unit, where curing time of the second adhesive agent is shorter than curing time of the first adhesive agent, and the first adhesive agent is higher than the second adhesive agent in adhesive strength and is provided on a region to which a reaction force generated by the piezoelectric element on the one surface of the fixing member is applied (for example, see Japanese Unexamined Patent Application Publication No. 2013-151093).

In addition, there has been proposed a liquid discharge head in which two slits, which are parallel to an arrangement direction of piezoelectric elements, are disposed on a surface of a vibration plate that is to be joined so as to face a film-like adhesive agent (for example, see Japanese Unexamined Patent Application Publication No. 2001-113696).

SUMMARY OF THE INVENTION

According to one aspect of the present disclosure, a liquid discharge head of the present disclosure includes: a flow path formation part in which pressure generation chambers are arranged; and a pressure generation unit configured to apply pressure to the pressure generation chambers. The pressure generation unit is formed by joining a vibration unit to the flow path formation part with a resin layer. The resin layer includes a curable resin composition including (A) an epoxy resin, (B) a polythiol compound, (C) at least one adhesiveness-imparting agent selected from the group consisting of a compound represented by General Formula (1) below, a titanium compound represented by General Formula (2-1) below, and a titanium compound represented by General Formula (2-2) below, and (D) a curing accelerator.

[General Formula (1)]

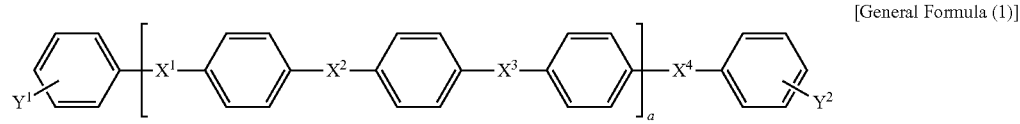

Here, in the General Formula (1), $X^1$, $X^2$, $X^3$, and $X^4$ each independently represent a single bond, O, S, $C(CH_3)_2$, CO, $CO_2$, or $SO_2$. $Y^1$ and $Y^2$ each independently represent H, Cl, or OH. a represents an integer of from 1 through 10,000.

[General Formula (2-1)]

[General Formula (2-2)]

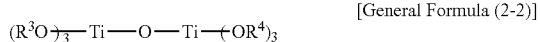

Here, in the General Formula (2-1) and the General Formula (2-2), $R^1$, $R^2$, $R^3$, and $R^4$ each independently represent an unsubstituted alkyl group having from 1 through 10 carbon atoms, an alkyl group having from 1 through carbon atoms and substituted with a hydroxyl group, or a group represented by General Formula (2-3) below. b and c each independently represent an integer of from 1 through 3, and b+c=4.

[General Formula (2-3)]

Here, in the General Formula (2-3), $R^5$ represents an alkyl group having from 1 through 6 carbon atoms.

Figure 1:
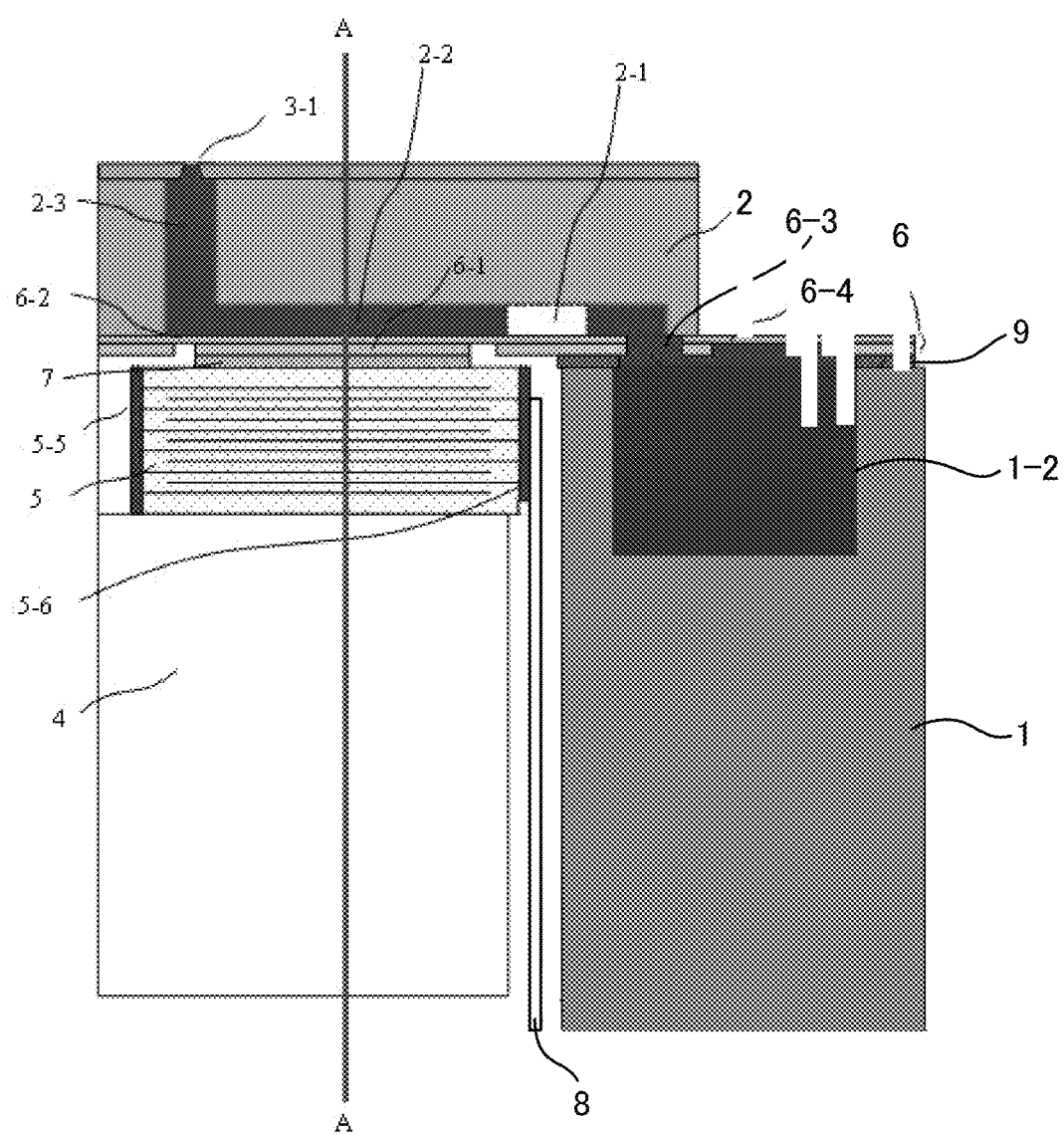
FIG. 1 is a cross-sectional explanatory view presenting one example of a liquid discharge head constituting a print head of a liquid discharge apparatus of the present disclosure along a longer direction of a liquid chamber.

DETAILED DESCRIPTION OF THE INVENTION (Liquid Discharge Head and Method for Producing Liquid Discharge Head)

A liquid discharge head of the present disclosure includes: a flow path formation part in which pressure generation chambers are arranged; and a pressure generation unit configured to apply pressure to the pressure generation chambers. The pressure generation unit is formed by joining a vibration unit to the flow path formation part with a resin layer. The resin layer includes a curable resin composition including (A) an epoxy resin, (B) a polythiol compound, (C) at least one adhesiveness-imparting agent selected from the group consisting of a compound represented by General Formula (1) below, a titanium compound represented by General Formula (2-1) below, and a titanium compound represented by General Formula (2-2) below, and (D) a curing accelerator, and further includes other members according to necessity.

A method for producing a liquid discharge head of the present disclosure is a method for producing a liquid discharge head including: a flow path formation part in which pressure generation chambers are arranged; and a pressure generation unit configured to apply pressure to the pressure generation chambers. The method includes joining a vibration unit to the flow path formation part with a resin layer to form the pressure generation unit. The resin layer includes a curable resin composition including (A) an epoxy resin, (B) a polythiol compound, (C) at least one adhesiveness-imparting agent selected from the group consisting of a compound represented by the above General Formula (1), a titanium compound represented by the above General Formula (2-1), and a titanium compound represented by the above General Formula (2-2), and (D) a curing accelerator, and further includes other members according to necessity.

Note that, the "liquid discharge" means discharging liquid droplets.

An object of the present disclosure is to provide a liquid discharge head capable of achieving excellent liquid discharging property and high durability.

According to the present disclosure, it is possible to provide a liquid discharge head capable of achieving excellent liquid discharging property and high durability.

The liquid discharge head of the present disclosure is based on the finding that the technique described in Japanese Unexamined Patent Application Publication No. 2013-151093 cannot relax stress applied to a region between the

[General Formula (1)]

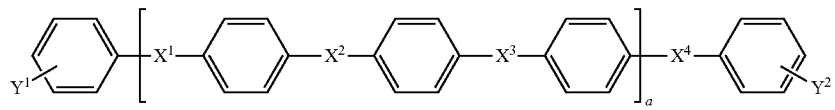

Here, in the General Formula (1), $X^1$, $X^2$, $X^3$, and $X^4$ each independently represent a single bond, O, S, $C(CH_3)_2$, CO, $CO_2$, or $SO_2$. $Y^1$ and $Y^2$ each independently represent H, Cl, or OH. a represents an integer of from 1 through 10,000.

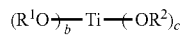 [General Formula (2-1)]

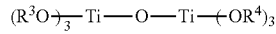 [General Formula (2-2)]

Here, in the General Formula (2-1) and the General Formula (2-2), $R^1$, $R^2$, $R^3$, and $R^4$ each independently represent an unsubstituted alkyl group having from 1 through 10 carbon atoms, an alkyl group having from 1 through 10 carbon atoms and substituted with a hydroxyl group, or a group represented by General Formula (2-3) below. b and c each independently represent an integer of from 1 through 3, and b+c=4.

[General Formula (2-3)]

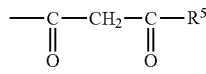

Here, in the General Formula (2-3), $R^5$ represents an alkyl group having from 1 through 6 carbon atoms.

vibration plate and the piezoelectric element after its joint and thus cannot prevent breakage such as exfoliation, because a holding structure of the piezoelectric element and a case head are joined with an adhesive agent.

The liquid discharge head of the present disclosure is based on the finding that the technique described in Japanese Unexamined Patent Application Publication No. 2001-113696 cannot prevent breakage or exfoliation at a region between the vibration plate and the piezoelectric element, because the adhesive agent used is a sheet-type and contains only one kind of the adhesive agent.

When a vibration unit and a vibration plate (part joined to a vibration element of a flow path formation part) are subjected to adhesion and joint with an adhesive agent, (1) the joint part of the vibration unit and the vibration plate is possibly broken or exfoliated, because of deformation and shearing stress, which are caused due to different linear expansion coefficients of the parts, and are generated due to a difference between the expansion/contraction amounts of both parts generated during thermal expansion and cooling contracture. (2) Likewise, there is a problem that the above-described joint part is possibly broken or exfoliated because of heating in the post process, operation of loading a liquid to the liquid discharge head, and use of the liquid discharge head with the liquid being loaded. This problem occurs easily as the size of the liquid discharge head becomes larger and the number of the nozzles is increased. As a result, the liquid discharge head has problems such as (3) deteriorated liquid discharging property (the liquid droplets are not discharged, variation of the liquid discharging speeds increases, and the like) and (4) decreased yields in the assembling processes.

Therefore, according to the liquid discharge head of the present disclosure, it is possible to prevent the joint part from being broken and exfoliated because a resin layer including a curable resin composition that can achieve flexible and favorable adhesion/joint to each part can relax stress to be applied to the joint part of the piezoelectric element—the pressure generation chamber, where the stress is caused by, for example, a difference between linear expansion coefficients of parts generated, when the liquid discharge head of the present disclosure is left to stand in the post processes or a high temperature environment, a low temperature environment, or a high humidity environment in use environments of the liquid discharge head, or when liquid is loaded in the liquid discharge head. As a result, it is possible to provide a liquid discharge head that can achieve excellent liquid discharging property and high durability.

<Resin Layer>

The resin layer includes a curable resin composition. The curable resin composition includes (A) an epoxy resin, (B) a polythiol compound, (C) at least one adhesiveness-imparting agent selected from the group consisting of a compound represented by the above General Formula (1), a titanium compound represented by the above General Formula (2-1), and a titanium compound represented by the above General Formula (2-2), and (D) a curing accelerator, and further includes other components according to necessity.

—(A) Epoxy Resin—

The epoxy resin as the (A) component is not particularly limited and may be appropriately selected depending on the intended purpose, so long as it is a compound including at least two epoxy groups in a molecule thereof. The epoxy resin may be a polyglycidylether compound of a mononuclear polyvalent phenol compound, a polyglycidylether compound of a polynuclear polyvalent phenol compound, polyglycidylether of a polyvalent alcohol; a polyglycidylether compound of a polyol obtained by adding polyalkylene oxide to the mononuclear polyvalent phenol compound, the polynuclear polyvalent phenol compound, or the polyvalent alcohol; homopolymer or copolymer of glycidyl methacrylate and glycidyl ester of an aliphatic, aromatic or alicyclic polybasic acid; an epoxy compound containing a glycidylamino group; an epoxy compound of a cyclic olefin compound, a heterocyclic compound, or a compound that is internally cross-linked by these epoxy resins having isocyanate at an end thereof (prepolymer); or a compound polymerized by a polyvalent active hydrogen compound (e.g., polyvalent phenol, polyamine, a carbonyl group-containing compound, and polyphosphate). These can be used alone or in combination.

Examples of the polyglycidylether compound of a mononuclear polyvalent phenol compound include hydroquinone, resorcin, pyrocatechol, and phloroglucinol.

Examples of the polyglycidylether compound of a polynuclear polyvalent phenol compound include dihydroxynaphthalene, biphenol, methylene bisphenol (bisphenol F), methylenebis (o-cresol), ethylidene bisphenol, isopropylidene bisphenol (bisphenol A), isopropylidene bis (o-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl) ethane, thiobisphenol, sulfobisphenol, oxybisphenol, phenol novolak, orthocresol novolak, ethylphenol novolak, butylphenol novolak, octyl phenol novolak, resorcin novolak, and terpenephenol.

Examples of the polyglycidylether of a polyvalent alcohol include polyglycidylethers of polyvalent alcohols such as ethylene glycol, propylene glycol, butylene glycol, hexanediol, polyglycol, thiodiglycol, dicyclopentadiene dimethanol, glycerin, trimethylolpropane, pentaerythritol, sorbitol, and bisphenol A-ethylene oxide adducts.

Examples of the homopolymer or copolymer of glycidyl methacrylate and glycidyl ester of an aliphatic, aromatic or alicyclic polybasic acid include homopolymers or copolymers of glycidyl methacrylate and glycidyl ester of an aliphatic, aromatic or alicyclic polybasic acid such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, and endomethylene tetrahydrophthalic acid.

Examples of the epoxy compound containing a glycidylamino group include N,N-diglycidyl aniline, bis(4-(N-methyl-N-glycidylamino)phenyl)methane, diglycidyl orthotoluidine, N,N-bis(2,3-epoxypropyl)-4-(2,3-epoxypropoxy)-2-methylaniline, N,N-bis-(2,3-epoxypropyl)-4-(2,3-epoxypropoxy)aniline, and N,N,N',N'-tetra (2,3-epoxypropyl)-4,4'-diaminodiphenylmethane.

Examples of the epoxy compound of a cyclic olefin compound include vinyl cyclohexene diepoxide, dicyclopentane diene diepoxide, 3,4-epoxy cyclohexyl methyl-3,4-epoxy cyclohexane carboxylate, 3,4-epoxy-6-methyl cyclohexyl methyl-6-methyl cyclohexane carboxylate, and bis(3, 4-epoxy-6-methylcyclohexylmethyl) adipate.

As an epoxidized conjugated diene polymer is, for example, epoxidized polybutadiene and a epoxidized styrene-butadiene copolymer product.

Examples of the heterocyclic compounds include triglycidyl isocyanurate.

Among them, in terms of improvement in characteristics of the cured product such as working property, adhesive property, toughness, a glass transition point, and solvent resistance of the curable resin composition, polyglycidylether of the polynuclear polyvalent phenol compound, polyglycidylether of a polyvalent alcohol, an alkylene oxide-modified epoxy resin of a polynuclear polyvalent phenol compound, and an epoxy compound containing a glycidylamino group are preferable, an alkylene oxide-modified epoxy resin of a polynuclear polyvalent phenol compound, diglycidyl ether of dicyclopentadiene dimethanol, and an epoxy compound containing a glycidylamino group are more preferable, a polypropylene oxide-modified epoxy resin of bisphenol A, diglycidyl ether of dicyclopentadiene dimethanol, diglycidyl orthotoluidine, N,N-bis(2,3-epoxypropyl)-4-(2,3-epoxypropoxy)-2-methylaniline, N,N-bis(2,3-epoxypropyl)-4-(2,3-epoxypropoxy)aniline are particularly preferable.

(A) The epoxy resin includes at least one epoxy resin selected from the group consisting of (E) an alkylene oxide-modified epoxy resin of a polynuclear polyvalent phenol compound, (F) a diglycidyl ether of dicyclopentadiene dimethanol, and (G) an epoxy compound containing a glycidylamino group. The content of the epoxy resin is preferably 10 parts by mass or more, particularly preferably 20 parts by mass or more but 50 parts by mass or less, relative to the total content (100 parts by mass) of (A) the epoxy resin, because excellent liquid discharging property and high durability can be achieved.

The epoxy resin as the (A) component may be free of a solvent, but can be used by diluting it with a dilution solvent so as to have a proper viscosity. As the dilution solvent, a reactive diluent that has reactivity with the epoxy group can be used.

—Reactive Diluent—

As the reactive diluent, a diluent including at least one epoxy group is preferably used, because bleeding is prevented when the curable resin composition of the present disclosure is cured.

The number of the epoxy groups included in the reactive diluent is not particularly limited and may be appropriately selected depending on the intended purpose. The number thereof may be one, or the number thereof may be two or more.

Examples of the reactive diluent having one epoxy group include n-butyl glycidyl ether, alkyl glycidyl ether having from 12 through 14 carbon atoms, allyl glycidyl ether, 2-ethylhexyl glycidyl ether, styrene oxide, phenyl glycidyl ether, cresyl glycidyl ether, p-sec-butylphenyl glycidyl ether, t-butylphenyl glycidyl ether, glycidyl methacrylate, and tertiary carboxylic glycidyl ester.

Examples of the reactive diluent having two epoxy groups include ethylene glycol diglycidyl ether, propylene glycol diglycidyl ether, butanediol diglycidyl ether, 1,6-hexanediol diglycidyl ether, and neopentyl glycol diglycidyl ether.

Examples of the reactive diluent having three or more epoxy groups include trimethylolpropane triglycidyl ether and glycerin triglycidyl ether.

Among them, those having two epoxy groups are preferable, and 1,6-hexanediol diglycidyl ether and neopentyl glycol diglycidyl ether are more preferable.

The content of the reactive diluent is preferably 1% by mass or more but 50% by mass or less, more preferably 5% by mass or more but 30% by mass or less, relative to the total content of (A) the epoxy resin, in terms of balance between inhibition of reduction in property of the cured product and working property of the curable resin composition.

—(B) Polythiol Compound—

The polythiol compound as the (B) component is not particularly limited and may be appropriately selected depending on the intended purpose, so long as it is a compound including at least two mercapto groups in a molecule thereof. Examples thereof include: thiol compounds obtained through esterification of polyol and a mercapto organic acid such as trimethylolpropane tris(thioglycolate), pentaerythritol tetrakis(thioglycolate), ethylene glycol dithioglycolate, tetraethylene glycol bis(3-mercaptopropionate), trimethylolpropane tris(3-mercaptopropionate), pentaerythritol tetrakis(3-mercaptothiopropionate), and dipentaerythritol poly(3-mercaptopropionate); alkyl polythiol compounds such as 1,4-butanedithiol, 1,6-hexanedithiol, and 1,10-decanedithiol; thiol compounds obtained by reacting polyether including a thiol group at an end thereof, polythioether including a thiol group at an end thereof, or an epoxy compound with hydrogen sulfide; thiol compounds including a thiol group at an end thereof, which are obtained by reacting a polythiol compound with an epoxy compound; and thiol compounds including no ester skeleton in molecules thereof, which are described in Japanese Patent No. 3974404.

These can be used alone or in combination.

Among them, in terms of easy availability and strong toughness of the cured product, tetraethylene glycol bis(3-mercaptopropionate), trimethylolpropane tris(3-mercaptopropionate), pentaerythritol tetrakis(3-mercaptothiopropionate), and dipentaerythritol poly(3-mercaptopropionate) are preferable, tetraethylene glycol bis(3-mercaptopropionate) and trimethylolpropane tris(3-mercaptopropionate) are more preferable.

In the present disclosure, it is preferable that a thiol compound having two mercapto groups in a molecule thereof and a thiol compound having three or more mercapto groups in a molecule thereof be used in combination, in order not to excessively increase crosslink density of the cured product. In this case, the content of the thiol compound having two mercapto groups in a molecule thereof is preferably 5% by mass or more but 95% by mass or less, more preferably 20% by mass or more but 80% by mass or less, still more preferably 30% by mass or more but 70% by mass or less, relative to the total content of the polythiol compound as the (B) component.

When the content of the polythiol compound as the (B) component is preferably 30 parts by mass or more but 200 parts by mass or less, more preferably 50 parts by mass or more but 150 parts by mass or less, relative to 100 parts by mass of (A) the epoxy resin (when the above reactive diluent is used, it is the total content of (A) the epoxy resin and the reactive diluent). When the content falls within a range of 30 parts by mass or more but 200 parts or less, curing ability of the curable resin composition is favorable.

—(C) Adhesiveness-Imparting Agent—

The adhesiveness-imparting agent as the (C) component enhances adhesive property to a member. Cured products of general curing resins somewhat have adhesive property. However, it is possible to drastically improve adhesive property to a member by using the adhesiveness-imparting agent as the (C) component in combination.

Examples of the adhesiveness-imparting agent as the (C) component include compounds represented by General Formula (1) below, titanium compounds represented by General Formula (2-1) below, and titanium compounds represented by General Formula (2-2) below. These can be used alone or in combination.

[General Formula (1)]

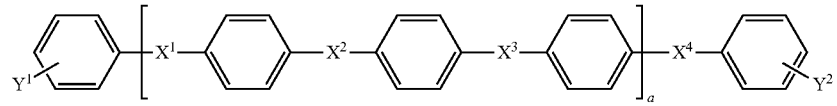

Here, in the General Formula (1), $X^1$, $X^2$, $X^3$, and $X^4$ each independently represent a single bond, O, S, $C(CH_3)_2$, CO, $CO_2$, or $SO_2$. $Y^1$ and $Y^2$ each independently represent H, Cl, or OH. a represents an integer of from 1 through 10,000.

[General Formula (2-1)]

[General Formula (2-2)]

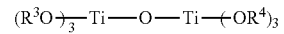

Here, in the General Formula (2-1) and the General Formula (2-2), $R^1$, $R^2$, $R^3$, and $R^4$ each independently represent an unsubstituted alkyl group having from 1 through 10 carbon atoms, an alkyl group having from 1 through 10 carbon atoms and substituted with a hydroxyl group, or a group represented by General Formula (2-3) below. b and c each independently represent an integer of from 1 through 3, and b+c=4.

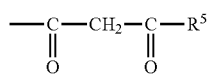
[General Formula (2-3)]

Here, in the General Formula (2-3), $R^5$ represents an alkyl group having from 1 through 6 carbon atoms.

Regarding $X^1$, $X^2$, $X^3$, and $X^4$ in the General Formula (1), for example, when $X^1$, $X^2$, $X^3$, and $X^4$ are each an oxygen atom, it becomes polyphenylene ether, while when $X^1$ and $X^3$ are each an oxygen atom and $X^2$ and $X^4$ are each $CO_2$, it becomes polycarbonate.

$Y^1$ and $Y^2$ in the General Formula (1) are H, Cl, or OH. These groups are derived from a method for producing the compound represented by the General Formula (1).

The compounds represented by the General Formula (1) are plastics exhibiting high heat resistance and are part of polymers called engineering plastics. Examples thereof include polyphenylene ether, polycarbonate, polyethersulfone, polysulfone, polyphenylene sulfone, polyphenylene sulfide, polyetheretherketone, and liquid crystal polymers. These can be used alone or in combination.

Among them, in terms of improvement in adhesive property between the different kind of materials, polyethersulfone (in the General Formula (1), $X^1$ and $X^3$ are oxygen, and $X^2$ and $X^4$ are $SO_2$), polysulfone (in the General Formula (1), $X^1$ is $SO_2$, $X^2$ and $X^4$ are oxygen, and $X^3$ is $C(CH_3)_2$), polyphenylene sulfone (in the General Formula (1), $X^1$ is $SO_2$, $X_2$ and $X_4$ are oxygen, and $X^3$ is a single bond), and polyphenylene sulfide (in the General Formula (1), $X^1$, $X^2$, $X^3$, and $X^4$ are all sulfur) are preferable, polyethersulfone is more preferable.

Examples of the alkyl group having from 1 through 10 carbon atoms, which is represented by $R^1$, $R^2$, $R^3$, and $R^4$ in the General Formula (2-1) and the General Formula (2-2) in the adhesiveness-imparting agent as the (C) component, include methyl, ethyl, propyl, isopropyl, butyl, isobutyl, s-butyl, t-butyl, amyl, isoamyl, t-amyl, hexyl, heptyl, octyl, isooctyl, 2-ethylhexyl, t-octyl, nonyl, isononyl, and decyl. In these alkyl groups, part of hydrogen atoms may be substituted with a hydroxyl group.

Examples of the alkyl group having from 1 through 6 carbon atoms, which is represented by $R^5$ in the General Formula (2-3), include methyl, ethyl, propyl, isopropyl, butyl, isobutyl, s-butyl, t-butyl, amyl, isoamyl, t-amyl, and hexyl.

In the present disclosure, it is preferable that at least one of $R^1$, $R^2$, $R^3$, and $R^4$ be a group represented by the General Formula (2-3) in terms of improvement in adhesive property to a base material. In that case, it is preferable that $R^5$ be methyl, ethyl, or propyl in terms of easy availability.

As the polyethersulfone, an appropriately produced product can be used or a commercially available product can be used.

As a method for producing polyethersulfone is as follows. For example, dichlorodiphenyl sulfone and bisphenol S are dissolved in a solvent having a high boiling point such as diphenyl ether or diphenylsulphone. Then, the resultant can be allowed to react using an alkali metal salt such as potassium carbonate at 140 degrees C. to 340 degrees C. for 1 to 20 hours to obtain polyethersulfone. In this case, when dichlorodiphenyl sulfone is excessively used compared to bisphenol S, ends of the compound obtained (i.e., $Y^1$ and $Y^2$ in the General Formula (1)) become chloride. Meanwhile, when bisphenol S is excessively used compared to dichlorodiphenyl sulfone, ends of the compound obtained become a hydroxyl group.

Examples of the commercially available products of polyethersulfone include SUMIKAEXCEL PES series (available from Sumitomo Chemical Company, Limited), PES series (available from Mitsui Chemicals, Inc.), ULTRASON E series (available from BASF Japan Ltd.), and Radel A series (available from Solvey Advanced Polymers LLC).

Examples of the titanium compounds used in the present disclosure include titanium tetraisopropoxide, titanium tetranormal butoxide, titanium butoxide dimmer, titanium tetra-2-ethylhexoxide, titanium diisopropoxybis(acetylacetonate), titanium di-2-ethylhexoxybis(2-ethyl-3-hydroxyhexoxide), titanium tetraacetylacetonate, and titanium diisopropoxybis(ethylacetoacetate). These can be used alone or in combination. Among them, in terms of improvement in adhesive property to a base material, titanium diisopropoxybis(ethylacetoacetate) is preferable.

In the present disclosure, the compound represented by the General Formula (1) is preferably used in combination with the titanium compound represented by the General Formula (2-1) or the compound represented by the General Formula (2-2), because the cured product will be particularly excellent in adhesive property. In that case, the content of the compound represented by the General Formula (1) is preferably 25% by mass or more but 80% by mass or less, more preferably 40% by mass or more but 70% by mass or less, relative to the total content of (C) the adhesiveness-imparting agent.

The content of the adhesiveness-imparting agent as the (C) component is preferably 1 part by mass or more but 20 parts by mass or less, more preferably 3 parts by mass or more but 15 parts by mass or less, still more preferably 5 parts by mass or more but 10 parts by mass or less, relative to 100 parts by mass of (A) the epoxy resin (when the above reactive diluent is used, it is the total content of (A) the epoxy resin and the reactive diluent), in terms of balance between adhesive property and toughness of the cured product.

—(D) Curing Accelerator—

The curing accelerator as the (D) component is preferably an amine-based curing accelerator.

Examples of the amine-based curing accelerator include imidazoles such as 1,2-dimethylimidazole, 1-benzyl-2-methylimidazole, 1-benzyl-2-phenylimidazole, and 1-cyanoethyl-2-methylimidazole; and tertiary amines such as benzyldimethylamine and 2,4,6-tris(dimethylaminomethyl)phenol. These can be used alone or in combination. Among them, imidazoles are preferable because control of a reaction rate is easy.

The content of the curing accelerator as the (D) component is preferably 1 part by mass or more but 20 parts by mass or less, more preferably 5 parts by mass or more but 15 parts by mass or less, relative to 100 parts by mass of (A) the epoxy resin (when the above reactive diluent is used, it is the total content of (A) the epoxy resin and the reactive diluent). When the content thereof is 1 part by mass or more, a curing rate of the curable resin composition is appropriate. When the content thereof is 20 parts by mass or less, the curable resin composition can be improved in storage stability.

<Other Components>

For example, an organic solvent, an inorganic filler, a powdered rubber, and an additive as the other components may be further added to the curable resin composition of the present disclosure, according to necessity.

—Organic Solvent—

The organic solvent is a viscosity modifier. Examples thereof include: amides such as N,N-dimethylformamide; ethers such as ethylene glycol monomethyl ether; ketones such as acetone and methyl ethyl ketone; alcohols such as methanol, ethanol, isopropanol, and butanol; and aromatic hydrocarbons such as benzene and toluene. These can be used alone or in combination.

The content of the organic solvent is preferably 1% by mass or more but 50% by mass or less, relative to the total content of the curable resin composition of the present disclosure.

—Inorganic Filler—

Examples of the inorganic filler include silica such as fused silica and crystalline silica; powders magnesium hydroxide, aluminum hydroxide, zinc borate, zinc molybdate, calcium carbonate, silicon nitride, silicon carbide, boron nitride, calcium silicate, potassium titanate, alumina, aluminum nitride, beryllia, zirconia, zircon, forsterite, steatite, spinel, mullite, and titania; beads obtained by forming the aforementioned materials in a spherical shape; and glass fibers. These can be used alone or in combination.

The content of the inorganic filler is preferably 5% by mass or more but 90% by mass or less, 10% by mass or more but 50% by mass or less, relative to the total solid content of the curable resin composition (total mass of all components excluding the volatilized component such as the organic solvent). When the content of the inorganic filler is 5% by mass or more, an effect on reducing a thermal expansion coefficient of the cured product can be obtained. Meanwhile, when the content thereof is 90% by mass or less, viscosity of the curable resin composition is appropriate, resulting in favorable working property.

—Powdered Rubber—

Examples of the powdered rubber include acrylonitrile-butadiene rubbers (NBR), carboxylic acid-modified NBRs, hydrogenated NBRs, core-shell type rubbers, styrene-butadiene rubbers, and acrylic rubbers. These can be used alone or in combination. Among them, core-shell type rubbers are preferable.

The core-shell type rubber is a rubber that includes particles each including a core layer and a shell layer. Examples thereof include those having a two-layer structure and being formed of a glassy polymer as an outer shell layer and a rubber-like polymer as an internal core layer; and those having a three-layer structure and being formed of a glassy polymer as an outer shell layer, a rubber-like polymer as an intermediate layer, and a glassy polymer as a core layer.

Examples of the glassy polymer include polymerized products of methyl methacrylate, polymerized products of methyl acrylate, and polymerized products of styrene.

Examples of the rubber-like polymer include polymerized products of butyl acrylate (butyl rubbers), silicone rubbers, and polybutadiene.

The content of the powdered rubber is preferably 0.1% by mass or more but 20% by mass or less, more preferably 1% by mass or more but 10% by mass or less, relative to the total solid content of the curable resin composition (total mass of all components excluding the volatilized component such as the organic solvent).

—Additive—

Examples of the additive include: non-reactive diluents (plasticizers) such as dioctyl phthalate, dibutyl phthalate, benzyl alcohol, and coal tar; fibrous fillers such as glass fibers, pulp fibers, synthetic fibers, and ceramic fibers; reinforcing materials such as glass cloth. aramid cloth and carbon fiber; pigments; silane coupling agents such as γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, γ-anilinopropyltriethoxysilane, γ-glycidoxypropyltrimethoxysilane, γ-glycidoxypropyltriethoxysilane, β-(3,4-epoxycyclohexyl) ethyltriethoxysilane, vinyltriethoxysilane, N-β-(N-vinylbenzylaminoethyl)-γ-aminopropyltriethoxysilane, γ-methacryloxypropyltrimethoxysilane, γ-chloropropyltrimethoxysilane, and γ-mercaptopropyltrimethoxysilane; lubricants such as candelilla waxes, carnauba waxes, vegetable waxes, insect waxes, bees waxes, lanolin, whale waxes, montan waxes, petroleum waxes, aliphatic waxes, aliphatic esters, aliphatic ethers, aromatic esters, and aromatic ethers; thickeners; thixotropic agents; antioxidants; light stabilizers; ultraviolet absorbers; flame retardants; defoaming agents; corrosion inhibitors; and routinely-used additives such as carbon black, colloidal silica, and colloidal alumina. Note that, in the present disclosure, an adhesive resin such as a xylene resin or a petroleum resin can be used in combination.

The content of the additive is preferably 0.1% by mass or more but 50% by mass or less, more preferably 1% by mass or more but 30% by mass or less, relative to the total solid content of the curable resin composition (total mass of all components excluding the volatilized component such as the organic solvent).

The curable resin composition of the present disclosure can be produced by stirring/melting/mixing/dispersing the (A) to (D) components and other components to be added according to necessity while the aforementioned components being subjected to a heating treatment according to necessity. An apparatus used for the stirring/melting/mixing/dispersing is not particularly limited and may be appropriately selected depending on the intended purpose. Examples thereof include a grinding mill, a triple roll mill, a ball mill, a planetary mixer, a bead mill, a planetary stirring machine, and an apparatus combined therewith, which are equipped with a stirrer and a heating device.

—Use—

The curable resin composition of the present disclosure is not particularly limited and can be used in various applications. The curable resin composition of the present disclosure can be used for, for example, adhesive agents, casting agents, sealing materials, sealing agents, fiber reinforcing resins, coating agents, and paints, and can be suitably used as an adhesive agent for the same or different kind of material(s) in terms of favorable adhesive property.

<Flow Path Formation Part>

A flow path formation part is a part in which pressure generation chambers are arranged.

The pressure generation chamber includes a nozzle configured to discharge liquid droplets and a liquid chamber in communication with the nozzle.

The nozzle plate includes a nozzle substrate and a water-repellent film over the nozzle substrate.

The shape, size, material, structure, etc. of the nozzle substrate are not particularly limited, and may be appropriately selected depending on the intended purpose.

The material of the nozzle substrate is not particularly limited, and may be appropriately selected depending on the intended purpose. Examples thereof include stainless steel, Al, Bi, Cr, InSn, ITO, Nb, $Nb_2O_5$, NiCr, Si, $SiO_2$, Sn, $Ta_2O_5$, Ti, W, ZAO ($ZnO+Al_2O_3$), and Zn. These can be used alone or in combination. Among them, stainless steel is preferable in terms of an anti-rust property.

The number, arrangement, and interval of the discharge ports, and the shape, size, and cross-sectional shape of the openings of the discharge ports, etc. are not particularly limited, and may be appropriately selected depending on the intended purpose.

<Pressure Generation Unit>

The pressure generation unit is a unit configured to apply pressure to the pressure generation chambers and is formed by joining a vibration unit to the flow path formation part with a resin layer.

As the vibration unit, a piezoelectric element is suitably used. The piezoelectric element can have, for example, a structure where electrodes configured to apply voltage to the top surface and the bottom surface of the piezoelectric material are provided. In this case, application of voltage between the top and bottom electrodes of the piezoelectric element from a driving unit gives compressive stress in the transverse direction of the film surface, which makes it possible to vibrate the film-like member in the vertical direction of the film.

The piezoelectric material is not particularly limited and may be appropriately selected depending on the intended purpose. Examples thereof include lead zirconate titanate (PZT), bismuth iron oxide, metal niobate, barium titanate, and those obtained by adding a different oxide or metal to these materials. Among them, lead zirconate titanate (PZT) is preferable.

An average thickness of the resin layer is preferably 0.1 μm or more but 2.5 μm or less. When the average thickness of the resin layer is 2.5 μm or less, adhesion reliability can be ensured. When the average thickness of the resin layer is 0.1 μm or more, high initial strength can be obtained. As a result, both adhesion reliability and initial adhesive property can be ensured.

<Other Members>

Examples of the other members include a stimulus generation member.

The impact generation member is a member configured to generate a stimulus to be applied to a liquid (ink).

The impact in the impact generation member is not particularly limited, and may be appropriately selected depending on the intended purpose. Examples thereof include heat (temperature), pressure, vibration, and light. These can be used alone or in combination. Among them, heat and pressure are preferable.

Examples of the impact generation member include a heating device, a pressurizing device, a piezoelectric element, a vibration generation device, an ultrasonic oscillator, and a light. Specific examples of the impact generation member include a piezoelectric actuator such as a piezoelectric element, a thermal actuator using an electrothermal conversion element such as a heat resistor to utilize a phase change due to film boiling of a liquid, a shape-memory-alloy actuator utilizing a phase change of a metal due to a temperature change, and a static actuator utilizing an electrostatic force.

When the impact is "heat", the following method is provided. Specifically, for example, a thermal head is used to impart a thermal energy corresponding to a print signal to liquid (ink) in the liquid discharge head. Bubbles are generated in the ink by the thermal energy, and thus the pressure of the bubbles discharges the ink as the liquid droplets from the nozzle holes of the nozzle plate.

When the impact is "pressure", the following method is provided. Specifically, for example, voltage is applied to the piezoelectric element bonded at a position called the pressure chamber disposed in an ink flow path in the liquid discharge head, to make the piezoelectric element bend. As a result, the capacity of the pressure chamber is contracted, to thereby discharge the liquid (ink) as the liquid droplets from the nozzle holes 1 of the liquid discharge head.

Among them, the piezo method for discharging the liquid (ink) by applying voltage to the piezo element is preferable.

Figure 2:
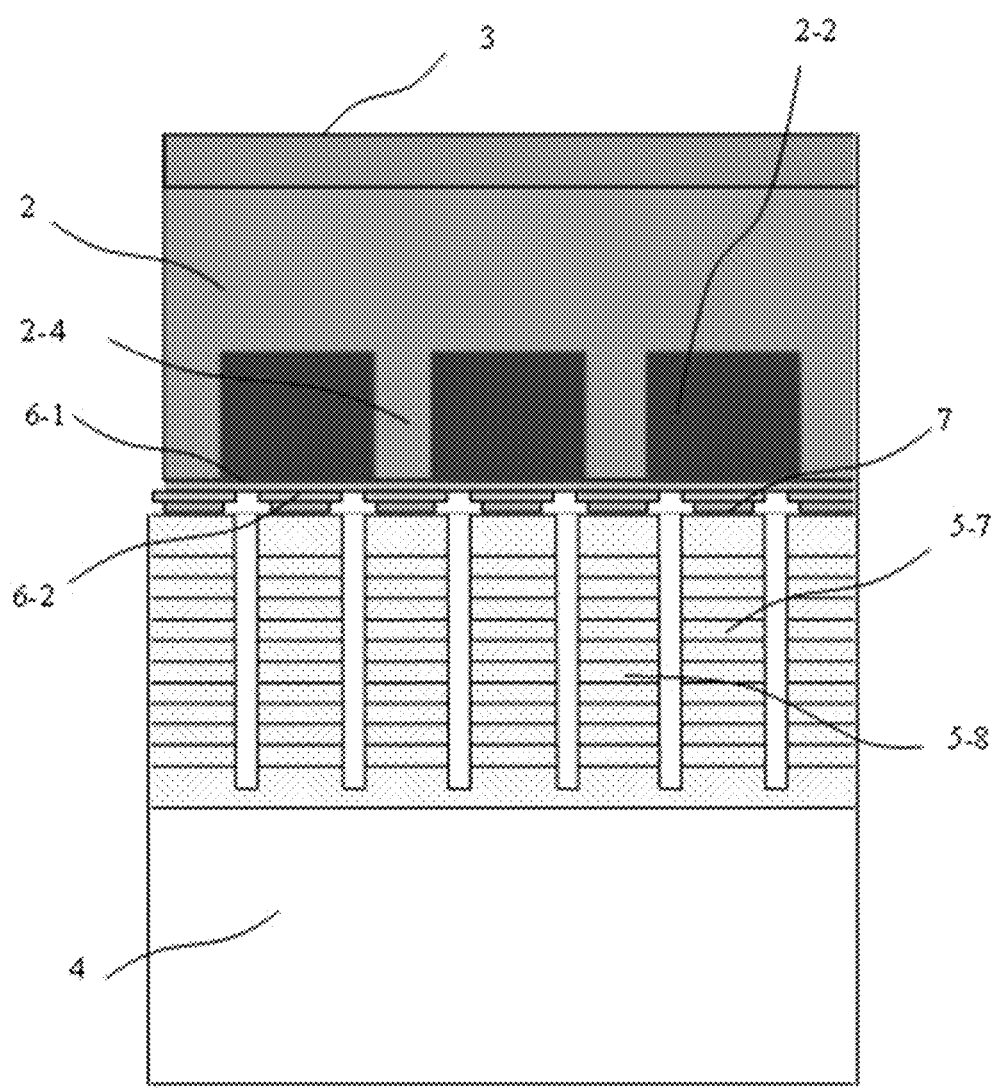
FIG. 2 is a cross-sectional explanatory view presenting one example of a liquid discharge apparatus of the present disclosure along a shorter direction of a liquid chamber.
Figure 3:
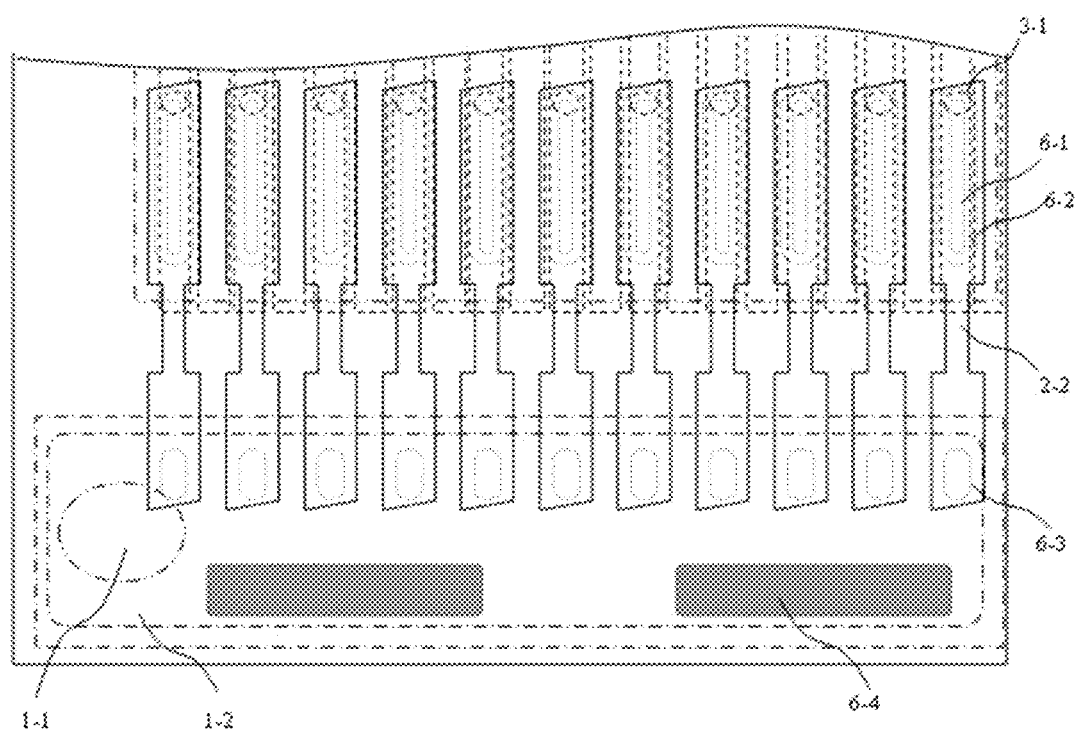
FIG. 3 is a cross-sectional explanatory view presenting one example of a liquid discharge apparatus of the present disclosure along a plane of a liquid chamber.

Here, one example of a liquid discharge head constituting a print head 34 will be described with reference to FIG. 1, FIG. 2, and FIG. 3. FIG. 1 is an enlarged view of an element of a liquid discharge head, FIG. 2 is an enlarged cross-sectional view of a main part of the head in a channel-to-channel direction. FIG. 3 is a top view of a pressure generation chamber part.

In the following description, the present description will be described with reference to a stacked piezoelectric element head. However, the same can be applied to other types of the liquid discharge heads (e.g., thermal type heads and electrostatic type heads).

The liquid discharge head includes: a frame 1 that is engraved to have an ink supply port 1-1 and a common liquid chamber 1-2; a flow path plate 2 that is engraved to have a fluid resistance part 2-1 and a pressure generation chamber 2-2 and includes a communication port 2-3 in communication with a nozzle 3-1; a nozzle plate including the nozzle 3-1; a vibration plate 6 including a convex part 6-1, a diaphragm part 6-2, and an ink inlet port 6-3; a stacked piezoelectric element 5 joined to the vibration plate via a resin layer 7; and a base 4 that fixes the stacked piezoelectric element 5.

The base 4 is formed of a barium titanate-based ceramic and joins the stacked piezoelectric elements 5 arranged in two lines.

The stacked piezoelectric element 5 includes a piezoelectric layer of lead zirconate titanate (PZT) having a thickness of 10 μm to 50 μm/layer and an internal electrode layer formed of silver.palladium (AgPd) having a thickness of several micrometers/layer, with the piezoelectric layer and the internal electrode layer being alternately stacked.

Both ends of the internal electrode layer are connected to an external electrode.

The stacked piezoelectric element 5 is divided to be interdigitated through the half cut dicing process and the divided parts of the stacked piezoelectric element 5 are alternately used as driving parts 5-7 or supporting parts (non-driving part) 5-8.

The outside of the external electrode is restricted in length through processing such as the notch so as to be divided through the half cut dicing process, and these become a plurality of individual electrodes 5-6. The other side is not divided through dicing and is conducted to form a common electrode 5-5.

The individual electrode 5-6 of the driving part and FPC8 are joined through solder. In addition, the common electrode 5-5 is joined to the Gnd electrode of FPC8 by providing an electrode layer at an end of the stacked piezoelectric element and winding around it. An unillustrated driver IC is mounted on the FPC8, and this controls application of driving voltage to the driving part 5-7.

The vibration plate 6 includes a thin-film diaphragm part 6-2, an island-shaped convex part (island part) 6-1 joined to the stacked piezoelectric element 5 to be a driving part 5-7 formed at a central part of the diaphragm part 6-2, a thick film including a beam joined to a supporting part (non-driving part) 5-8, and an aperture that is an ink inlet port 6-3, and the vibration plate 6 is formed by stacking two or more layers of the Ni plating films through the electroforming process.

The diaphragm part is 3 µm in thickness and 35 µm in width (one side). A portion facing the common liquid chamber 1-2 is provided with a thin film part 6-4 formed of one layer of the vibration plate and functions as absorption of the pressure of the common liquid chamber.

The island-shaped convex part 6-1 of the vibration plate 6 and the driving part 5-7 of the stacked piezoelectric element 5, and the vibration plate 6 and the frame 1 are subjected to adhesion and joint by patterning the resin layer 7 including a gap material.

The resin layer 7 is required to have various functions, but has the following two functions as representative functions.

(1) Transmitting vibration generated in the stacked piezoelectric element 5 to the island-shaped convex part 6-1 of the vibration plate 6.

(2) Continuing to maintain the function (1) without breakage and exfoliation.

In order to achieve the function (1), the resin layer 7 is favorably hard, thin, or hard and thin. In order to achieve the function (2), the resin layer 7 favorably satisfies at least one of high adhesive strength at an interface between the stacked piezoelectric element 5 and the vibration plate 6, and softness.

Regarding the function (2), when any deformation (vertical strain, shearing force, or combination thereof) is generated at an interface between the resin layer 7 and the stacked piezoelectric element 5 or the vibration plate 6, stress occurs accordingly with the deformation, to thereby cause exfoliation. The harder the resin layer 7 is, the larger the stress is, and thus the above exfoliation phenomenon occurs easily. That is, as the resin layer 7 is harder, the discharge efficiency of the liquid discharge head (i.e., the discharging speed or discharge amount with respect to the input voltage) is more improved, but durability to use environments (e.g., temperature and humidity) becomes low.

As the flow path plate 2, a silicon monocrystal substrate is engraved to have the fluid resistance part 2-1 and the pressure generation chamber 2-2 and includes a penetration port that is the communication port 2-3 at a position facing the nozzle 3-1, by patterning it through the etching process.

Parts left through the etching are each a partition 2-4 of the pressure generation chamber 2-2. Moreover, in this head, a part obtained by narrowing the etching width is provided and is referred to as the fluid resistance part 2-1.

A nozzle plate 3 is a material formed of a metal material, particularly, for example, a Ni plating film through the electroforming process. The nozzle plate 3 includes a plurality of nozzles 3-1 each of which is a fine discharge port configured to discharge ink droplets. The inner shape (inner side shape) of the nozzle 3-1 is formed in a horn shape (it may be an approximately cylindrical shape or an approximately truncated cone shape). Regarding a diameter of the nozzle 3-1, a diameter at a side of the outlet of the ink droplets is 20 µm or more but 35 µm or less. The nozzle pitch of each line is 150 dpi.

The ink discharge surface (side of the nozzle surface) of the nozzle plate 3 is provided with a water-repellent layer 3-2 that has been subjected to an unillustrated water-repellent surface treatment. By providing the water-repellent-treated film, which is selected, depending on ink physical property, from those obtained through PTFE-Ni eutectoid plating or electrodeposition coating with a fluorine resin, those obtained by subjecting a vaporizable fluorine resin (e.g., fluorinated pitch) to vapor deposition coating, those obtained by baking a silicone resin fluorine-based resin after coating of a solvent, and the like, the shape of the ink droplets and the discharging property are stabilized, which makes it possible to achieve high-quality images.

The flame 1 engraved to have the ink supply port 1-1 and the common liquid chamber 1-2 is produced through the resin molding. In such a configured inkjet head, by applying drive waveform (pulse voltage of 10 V to 50 V) to the driving part 5-7 depending on a print signal, displacement arises in the driving part 5-7 in the stacked direction of the piezoelectric elements. Then, the pressure generation chamber 2-2 is pressurized via the vibration plate 3 to increase pressure. As a result, ink droplets are discharged from the nozzle 3-1.

After completion of discharging the ink droplets, the ink pressure in the pressure generation chamber 2-2 is decreased, and negative pressure arises in the pressure generation chamber 2-2 because of inertia of the ink flow and the electric discharge process of the driving pulse, transferring to an ink loading process. At this time, the ink supplied from an ink tank flows into the common liquid chamber 1-2. Then, the ink moves from the common liquid chamber 1-2 to the fluid resistance part 2-1 via the ink inlet port 6-3, and is loaded in the pressure generation chamber 2-2.

The fluid resistance part 2-1 has an effect on attenuation of the remaining pressure vibration after discharge, while it exhibits resistance to refilling (refill) due to the surface tension. Appropriate selection of the fluid resistance part balances the attenuation of the remaining pressure with the refilling time, which shortens time (driving cycle) until which the next discharge operation for the ink droplets will start.

(Liquid Discharge Apparatus)

A liquid discharge apparatus of the present disclosure includes the liquid discharge head of the present disclosure, and further includes other units according to necessity.

<Liquid Droplets>

The liquid droplets are not particularly limited and may be appropriately selected depending on the intended purpose, so long as the liquid droplets are liquid that can be discharged with the liquid discharge head. Examples thereof include ink, an inkjet ink, a photopolymerizable ink, a pre-treatment liquid, a fixing treatment liquid, a resist, and a pattern forming material. Among them, an inkjet ink is particularly preferable.

<Other Units>

Examples of the other units include control units.

The control unit is not particularly limited and may be appropriately selected depending on the intended purpose, so long as it can control the operations of each unit. Examples thereof include devices such as sequencers and computers.

(Image Forming Apparatus)

An image forming apparatus of the present disclosure includes an ink housing unit and a liquid discharge head, and further includes other units according to necessity.

<Ink Housing Unit>

The ink housing unit is a unit configured to house an inkjet ink. Examples thereof include tanks and ink cartridges.

The ink cartridge includes a container and the inkjet ink housed in the container, and further includes other members appropriately selected according to necessity.

The container is not particularly limited, and the shape, structure, size, material, etc. of the container may be appropriately selected depending on the intended purpose. Preferable examples thereof include those having an ink bag made of an aluminum laminate film, a resin film, or the like.

<Liquid Discharge Head>

The liquid discharge head is a unit configured to apply a stimulus to the inkjet ink and discharge the ink to thereby print an image on a print medium.

As the liquid discharge head, the liquid discharge head of the present disclosure is used.

<Inkjet Ink>

The inkjet ink may be any of a water-based ink containing water as a main solvent, a photopolymerizable ink containing a reactive organic compound as a solvent, an oil-based ink containing a solvent that does not volatilize at 200 degrees C. or lower as a main solvent, and a solvent ink containing a volatile solvent as a main solvent.

<<Aqueous Ink>>

For example, an organic solvent, water, a coloring material, a resin, and an additive used for the aqueous ink will be described hereinafter.

<Organic Solvent>

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, propyleneglycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

The content of the organic solvent in ink has no particular limit and can be suitably selected to suit a particular application. In terms of the drying property and discharging reliability of the ink, the content is preferably from 10 to 60 percent by mass and more preferably from 20 to 60 percent by mass.

<Water>

The content of water in the ink has no particular limit and can be suitably selected to suit a particular application. In terms of the drying property and discharging reliability of the ink, the content is preferably from 10 to 90 percent by mass and more preferably from 20 to 60 percent by mass.

<Coloring Material>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The content of the coloring material in ink is preferably from 0.1 to 15 percent by mass and more preferably from 1 to 10 percent by mass in terms of enhancement of image density, favorable fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment Dispersion>

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the content of the pigment in the pigment dispersion is not particularly limited and can be suitably selected to suit a particular application. In terms of improving discharging stability and image density, the content is preferably from 0.1 to 50 percent by mass and more preferably from 0.1 to 30 percent by mass.

During the production, coarse particles are optionally filtered off with a filter, a centrifuge, etc. preferably followed by degassing.

<Resin>

The type of the resin contained in the ink has no particular limit and can be suitably selected to suit a particular application. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The content of the resin is not particularly limited and can be suitably selected to suit to a particular application. In terms of fixability and storage stability of ink, it is preferably from 1 to 30 percent by mass and more preferably from 5 to 20 percent by mass to the total content of the ink.

The particle diameter of the solid portion in ink has no particular limit and can be suitably selected to suit a particular application. For example, the maximum frequency in the maximum number conversion is preferably from 20 to 1,000 and more preferably from 20 to 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

<Additive>

Ink may further optionally contain a surfactant, a defoaming agent, a preservative and fungicide, a corrosion inhibitor, a pH regulator, etc.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chainmodified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl silooxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, steallyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit and can be suitably selected to suit a particular application. For example, a compound in which the polyalkylene oxide structure represented by the following Chemical structure S-1 is introduced into the side chain of the Si site of dimethyl polysiloxane.

[Chemical structure S-1]

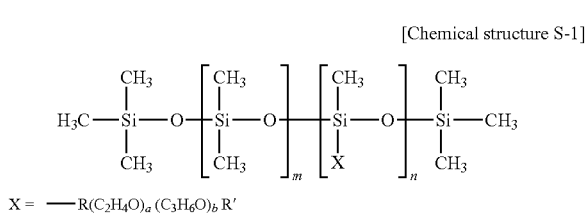

$X = \text{---}R(C_2H_4O)_a(C_3H_6O)_bR'$

In the Chemical structure S-1, "m", "n", "a", and "b" each, respectively represent integers, R represents an alkylene group, and R' represents an alkyl group.

As the polyether-modified silicone-based surfactant, a commercially available product can be used. Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorosurfactant in which the number of carbon atoms replaced with fluorine atoms is from 2 to 16 is preferable and, 4 to 16, more preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following General Formula F-1 or General Formula F-2 is more preferable.

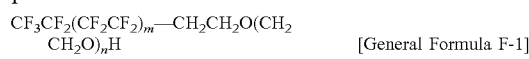
$CF_3CF_2(CF_2CF_2)_m\text{---}CH_2CH_2O(CH_2CH_2O)_nH$ [General Formula F-1]

In the General Formula f-1, "m" is preferably 0 or an integer of from 1 to 10 and "n" is preferably 0 or an integer of from 1 to 40.

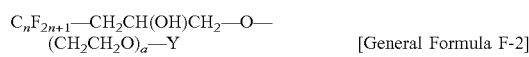
$C_nF_{2n+1}\text{---}CH_2CH(OH)CH_2\text{---}O\text{---}(CH_2CH_2O)_a\text{---}Y$ [General Formula F-2]

In the General Formula F-2, Y represents H, $C_nF_{2n+1}$, where "n" is an integer of from 1 to 6, $H_2CH(OH)CH_2\text{---}CF_{2n+1}$, where n represents an integer of from 4 to 6, or $C_pH_{2p+1}$, where p represents an integer of from 1 to 19. "a" represents an integer of from 4 to 14.

Products available on the market may be used as the fluorosurfactant.

Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, CAPSTONE FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FS-3100, FS-34, and FS-300 (all manufactured by The Chemours Company), FT-110, FT-250, FT-251, FT-400S, FT-150, and FT-400SW (all manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dying property to paper.

The content of the surfactant in ink is not particularly limited and can be suitably selected to suit a particular application. It is preferably from 0.001 to 5 percent by mass and more preferably from 0.05 to 5 percent by mass ink in terms of excellent wettability and discharging stability and improvement on image quality.

<Defoaming Agent>

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

<Preservatives and Fungicides>

The preservatives and fungicides are not particularly limited. A specific example is 1,2-benzisothiazolin-3-one.

<Corrosion Inhibitor>

The corrosion inhibitor has not particular limit. Examples thereof include acid sulfite and sodium thiosulfate.

<pH Regulator>

The pH regulator is not particularly limited so long as it can adjust the pH to 7 or higher. Specific examples thereof include, but are not limited to, amines such as diethanol amine and triethanol amine.

<<Photopolymerizable Ink>>

The photopolymerizable ink includes an active-energy-ray-curable composition, and further includes other components according to necessity.

The content of the active-energy-ray-curable composition is preferably from 10% by mass to 70% by mass relative to the total content of the photopolymerizable ink. Compounds that can be used are different depending on photo-curing reactions, and they are classified into radically-polymerizable photo-curable compounds for which a photoradical generation initiator is used, and cationically-polymerizable photo-curable compounds for which a photoacid generation initiator is used. It is also possible to use the radically-polymerizable photo-curable compound and the cationically-polymerizable photo-curable compound by mixing them, and any design can be performed depending on curing property, close adhesive strength, and an image formation process.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet rays, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Polymerization Initiator>

The active-energy-ray-curable composition of the present disclosure optionally contains a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimthyl benzylamine and 4,4'-bis(diethylamino) benzophenone. The content thereof may be appropriately determined depending on the identity (type) of the polymerization initiator and the content thereof.

<Colorant>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The active-energy-ray-curable composition of the present disclosure optionally contains an organic solvent although it is preferable to spare it. The active-energy-ray-curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-Energy-Ray-Curable Composition>

The active-energy-ray-curable composition of the present disclosure can be prepared by using the components described above. The preparation devices and conditions are not particularly limited. For example, the curable composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<<Oil-Based Ink>>

The oil-based ink contains an organic solvent, a pigment, a dispersant, and other additives. The pigment and the dispersant may be the same as those used in the photopolymerizable ink.

As the organic solvent, organic solvents such as an ester solvent, an alcohol solvent, a higher fatty acid solvent, a hydrocarbon solvent, and ether can be used. These can be used alone, or two or more of them can be mixed for use.

Examples of the ester solvent include methyl laurate, isopropyl laurate, isopropyl myristate, isopropyl palmitate, isooctyl palmitate, isostearyl palmitate, methyl oleate, ethyl oleate, isopropyl oleate, butyl oleate, methyl linoleate, isobutyl linoleate, ethyl linoleate, isopropyl isostearate, methyl soyate, isobutyl soyate, tall oil methyl, tall oil isobutyl, diisopropyl adipate, diisopropyl sebacate, diethyl sebacate, propylene glycol monocaprate, trimethylolpropane tri-2-ethylhexanoate, and glyceryl tri-2-ethyl hexanoate.

Examples of the alcohol solvent include isomyristyl alcohol, isopalmityl alcohol, isostearyl alcohol, and oleyl alcohol.

Examples of the higher fatty acid solvent include isononanoic acid, isomyristic acid, isopalmitic acid, oleic acid, and isostearic acid.

Examples of the hydrocarbon solvent include an aliphatic hydrocarbon solvent, an alicyclic hydrocarbon-based solvent, and an aromatic hydrocarbon solvent.

Examples of the aliphatic hydrocarbon solvent and alicyclic hydrocarbon-based solvent include "TECLEAN N-16, TECLEAN N-20, TECLEAN N-22, NO. 0 SOLVENT L, NO. 0 SOLVENT M, NO. 0 SOLVENT H, AF-4, AF-5, AF-6, and AF-7" (all being product names) manufactured by Shin Nihon Sekiyu Kabushiki-Gaisha, "NISSEKI ISOZOL and NAPHTHEZOL" (both being product names) manufactured by Shin Nihon Sekiyu Kagaku Kabushiki-Gaisha, and "ISOPAR G, ISOPAR H, ISOPAR L, ISOPAR M, EXXOL D40, EXXOL D80, EXXOL D100, and EXXOL D140" (all being product names) manufactured by Exxon Mobil Corporation.

Examples of the ether solvent include diethyl glycol monobutyl ether, ethylene glycol monobutyl ether, propylene glycol monobutyl ether, and propylene glycol dibutyl ether.

The content of the organic solvent is preferably 60% by mass or more, and more preferably 70% by mass or more but 98% by mass or less relative to the total content of the oil-based ink.

<<Solvent Ink>>

The solvent ink contains an organic solvent, a pigment, a pigment dispersant, and a binder resin, and further contains other components according to necessity.

The organic solvent may be a volatile organic solvent that is used in a general solvent-based ink.

Examples of the organic solvent include alcohols, glycols, glycol ethers, esters, ketones, aromatic compounds, and nitrogen-containing compounds.

Examples of the alcohols include methyl alcohol, ethyl alcohol, n-propyl alcohol, isopropyl alcohol, n-butyl alcohol, tridecyl alcohol, cyclohexyl alcohol, and 2-methylcyclohexyl alcohol.

Examples of the glycols include ethylene glycol, diethylene glycol, triethylene glycol, polyethylene glycol, propylene glycol, dipropylene glycol, and glycerin.

Examples of the glycol ethers include ethylene glycol monomethyl ether, ethylene glycol monoethyl ether, ethylene glycol monobutyl ether, ethylene glycol diethyl ether, and ethylene glycol dimethyl ether.

Examples of the esters include ethyl acetate, isopropylene acetate, n-butyl acetate, methyl lactate, ethyl lactate, and butyl lactate.

Examples of the ketones include acetone, methyl ethyl ketone, methyl isobutyl ketone, cyclohexanone, isophorone, and diacetone alcohol.

Examples of the aromatic compound include toluene and xylene.

Examples of the nitrogen-containing compound include acetonitrile, γ-butyrolactone, γ-valerolactone, N-methyl-2-pyrrolidone, and N-ethyl-2-pyrrolidone.

Various solvents are selected in terms of adaptability to the properties of the head nozzles during printing, safety, and a drying property, and a plurality of the solvents can be used as a mixture according to necessity.

The solvent ink preferably contains glycol ether as the organic solvent.

Examples of the glycol ether include diethylene glycol monomethyl ether, diethylene glycol monobutyl ether, diethylene glycol dimethyl ether, diethylene glycol ethyl methyl ether, diethylene glycol diethyl ether, diethylene glycol dibutyl ether, dipropylene glycol monomethyl ether, dipropylene glycol dimethyl ether, propylene glycol monomethyl ether acetate, diethylene glycol monoethyl ether acetate, and diethylene glycol monobutyl ether acetate.

The binder resin used in the solvent ink may be a binder resin that is commonly used in common ink compositions. The binder resin is not particularly limited and may be appropriately selected depending on the intended purpose. Examples thereof include: amino resins such as a polyester resin, an acrylic resin, a vinyl chloride resin, an epoxy resin, a phenol resin, a novolac resin, a rosin-modified phenol resin, melamine, and benzoguanamine; cellulose ester resins such as a polyamide resin, cellulose diacetate, cellulose triacetate, nitrocellulose, cellulose nitrate, cellulose propionate, and cellulose acetate butyrate; and cellulose ether resins such as methyl cellulose, ethyl cellulose, benzyl cellulose, trityl cellulose, cyan ethyl cellulose, carboxymethyl cellulose, carboxyethyl cellulose, and aminoethyl cellulose. Among them, incorporation of a polyester resin, an acrylic resin, and a vinyl chloride resin is preferable because close adhesiveness with a base material upon printing will be improved.

As the polyester resin, both a saturated polyester resin and an unsaturated polyester resin may be used. The polyester resin is produced through condensation reaction between a polybasic acid and a polyvalent alcohol. The number average molecular weight of the polyester resin is preferably from 1,000 through 50,000, and more preferably from 2,000 through 20,000.

The acrylic resin may be a product obtained by copolymerizing radically-polymerizable monomers that are commonly used.

Examples of the radically-polymerizable monomers include (meth)acrylic acid esters. Examples of the (meth)acrylic acid esters include (meth)acrylic acid esters: such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate.

Examples of the vinyl include styrene, vinyl toluene, α-methyl styrene, vinyl acetate, vinyl propionate, vinyl pyrrolidone, vinyl chloride, vinylidene chloride, vinylidene fluoride, ethyl vinyl ether, and isobutyl vinyl ether.

Examples of α-olefins include ethylene and propylene.

Examples of carboxyl group-containing monomers include acrylic acid, methacrylic acid, maleic acid, fumaric acid, itaconic acid, mono-n-butyl maleate, mono-n-butyl fumarate, mono-n-butyl itaconate, and crotonic acid.

Examples of hydroxyl group-containing (meth)acrylic acid esters include 2-hydroxyethyl (meth)acrylate, 2-hydroxypropyl (meth)acrylate, 3-hydroxypropyl (meth)acrylate, 4-hydroxy-butyl (meth)acrylate, (2-hydroxymethyl) ethyl acrylate, (2-hydroxymethyl)butyl acrylate, (4-hydroxymethylcyclohexyl)methyl (meth)acrylate, glycerin mono(meth)acrylate, 2-(meth)acryloyloxyethyl-2-hydroxypropyl phthalate, and 2-hydroxy-3-phenoxypropyl (meth)acrylate.

Examples of amide group-containing monomers include acrylamide, methacrylamide, maleic acid amide, and diacetone acrylamide.

Examples of glycidyl group-containing monomer include glycidyl methacrylate and allyl glycidyl ether.

Examples of cyano group-containing monomers include acrylonitrile and methacrylonitrile.

Examples of dienes include butadiene and isoprene.

Examples of hydroxyl group-containing allyl compounds include allyl alcohol and 2-hydroxyethyl allyl ether.

Examples of tertiary amino group-containing monomers include dimethyl amino ethyl methacrylate and diethyl amino ethyl methacrylate.

Examples of alkoxy silyl group-containing monomers include vinyl trimethoxysilane, vinyl triethoxysilane, vinyl triisopropoxysilane, vinyl tris(β-methoxyethoxy)silane, vinyl methyl dimethoxysilane, vinyl methyl diethoxysilane, vinyl dimethyl methoxysilane, vinyl dimethyl ethoxysilane, 3-methacryloxypropyltrimethoxysilane, 3-methacryloxypropyltriethoxysilane, 3-methacryloxypropylmethyldimethoxysilane, and 3-methacryloxypropylmethyldiethoxysilane.

Examples of monomers having two or more unsaturated bonds per molecule include diallyl phthalate, divinyl benzene, allyl acrylate, and trimethylolpropane trimethacrylate.

These monomers can be used alone, or two or more monomers can be used in combination.

Examples of the vinyl chloride resin include resins obtained by copolymerizing vinyl chloride with another monomer such as vinyl acetate, vinylidene chloride, acrylic, and maleic acid. Among them, a vinyl chloride/vinyl acetate copolymerized resin, or a copolymerized resin having a weight average molecular weight of 30,000 or less is preferable.

These resins can be used in combination. The content of the resin is preferably 1% by mass or more but 20% by mass or less, and more preferably 1% by mass or more but 10% by mass or less.

The color of the ink is not particularly limited and may be appropriately selected depending on the intended purpose. Examples thereof include yellow, magenta, cyan, and black.

When printing is performed with an ink set in which 2 or more of these colors are used in combination, a multi-color image can be formed. When printing is performed with an ink set in which all of the colors are used in combination, a full-color image can be formed.

Figure 4:
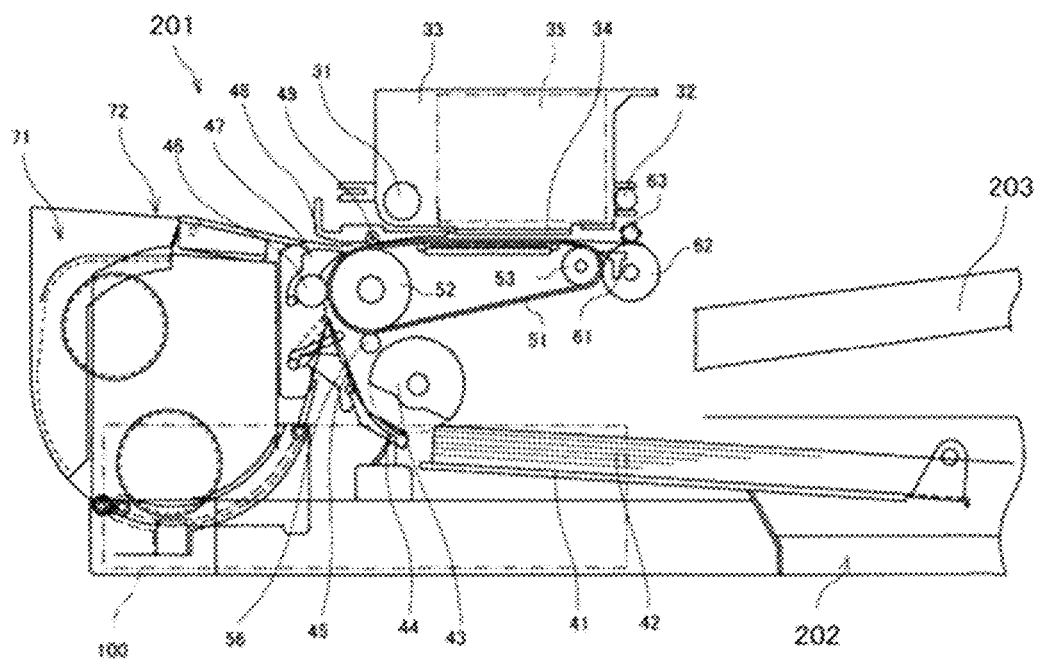
FIG. 4 is a side schematic configuration view presenting one example of an entire configuration of a mechanical section of a liquid discharge apparatus of the present disclosure.
Figure 5:
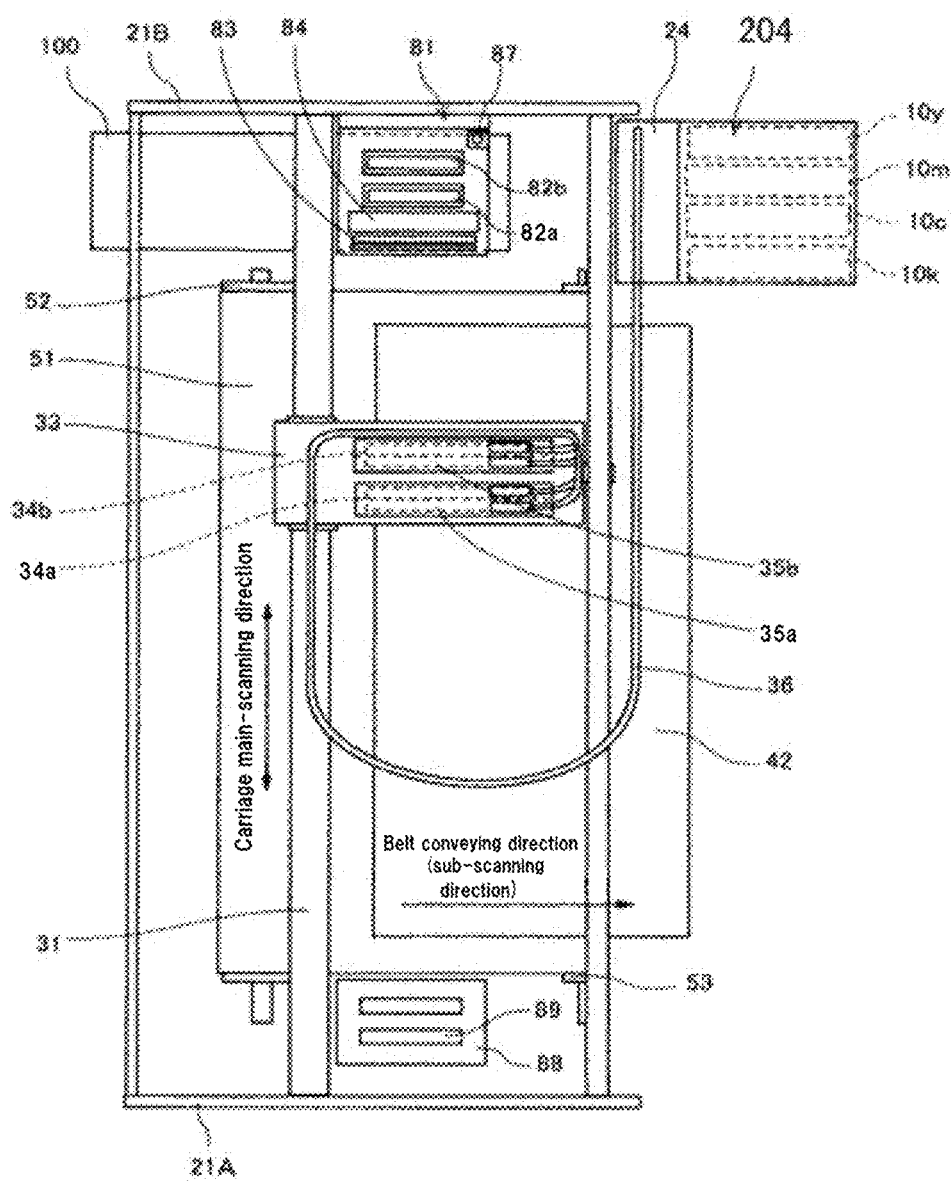
FIG. 5 is a plain explanatory view of a main part presenting one example of a mechanical section of a liquid discharge apparatus of the present disclosure.

Here, one example of a liquid discharge apparatus of the present disclosure will be described with reference to FIG. 4 and FIG. 5. FIG. 4 is a side explanatory view presenting one example of an entire configuration of the liquid discharge apparatus of the present disclosure. FIG. 5 is a plain explanatory view of a main part presenting one example of the liquid discharge apparatus of the present disclosure.

This liquid discharge apparatus is a serial type inkjet printing apparatus, and supports a carriage 33 slidably in a main-scanning direction on main and sub side rods 31 and 32, which are guide members laterally bridged between left and right side plates 21A and 21B of an apparatus body 201.

It moves and scans the carriage in the direction of the arrow in FIG. 4 (carriage main-scanning direction) via a timing belt by means of an unillustrated main scanning motor.

This carriage 33 is mounted with print heads 34a and 34b (referred to as "print head(s) 34" when they are not distinguished) each of which is formed of the liquid discharge head configured to discharge ink droplets of each color such as yellow (Y), cyan (C), magenta (M), or black (B). The print heads 34 each have nozzle lines including a plurality of nozzles that are arranged in a sub-scanning direction perpendicular to the main-scanning direction, and are mounted so that the direction in which ink droplets are to be discharged faces downward.

The print heads 34 each have two nozzle lines. One nozzle line of the print head 34a discharges liquid droplets of black (K), and the other nozzle line of the print head 34a discharges liquid droplets of cyan (C). One nozzle line of the print head 34b discharges liquid droplets of magenta (M), and the other nozzle line of the print head 34b discharges liquid droplets of yellow (Y).

As the print head 34, those including nozzle lines of the respective colors in which a plurality of nozzles are arranged in one nozzle surface can be used.

The carriage 33 is mounted with sub tanks 35a and 35b (referred to as "sub tank(s) 35 when they are not distinguished"), each of which is a sub tank as a second ink supplying part configured to supply ink of each color corresponding to the nozzle line of the print head 34.

This sub tank 35 is refilled and supplied with the printing liquid of each color from ink cartridges (main tanks) 10y, 10m, 10c, and 10k, which are detachably mounted on a cartridges-loading part 204, via a supply tube 36 of each color by means of a supply pump unit 24.

Meanwhile, as a sheet feeding section configured to feed sheets 42 loaded on a sheet stacking section (pressure plate) 41 of a sheet feeding tray 202, there are provided a half-moon roll (sheet feeding roll) 43 configured to feed the sheets 42 one by one from the sheet stacking section 41, and a separation pad 44 that is provided oppositely to the sheet feeding roll 43 and is formed of a material having a large coefficient of fiction. This separation pad 44 is disposed at a side of the sheet feeding roll 43.

Further, in order for the sheet 42 fed from the sheet feeding section to be delivered to below the print heads 34, there are provided a guide 45 configured to guide the sheet 42, a counter roller 46, a conveying guide member 47, and a pressing member 48 including a leading end pressurizing roll 49. Further, there is provided a conveying belt 51, which is a conveying unit configured to electrostatically adsorb the fed sheet 42 and convey it to a position facing the print heads 34.

The conveying belt 51 is an endless belt, bridged between a conveying roller 52 and a tension roller 53, and configured to rotate in a belt conveying direction (sub-scanning direction).

There is also provided a charging roller 56 that is a charging unit configured to electrically charge the surface of the conveying belt 51.

The charging roller 56 is in contact with the surface layer of the conveying belt 51 and is disposed so as to be rotated correspondingly with the rotation of the conveying belt 51.

The conveying belt 51 rotates and moves in the belt conveying direction in FIG. 4 by driving/rotating the conveying roller 52 by an unillustrated sub scanning motor via the timing.

Moreover, as a sheet ejection section configured to eject the sheet 42 printed by the print heads 34, there are provided a separation claw 61 configured to separate the sheet 42 from the conveying belt 51, a sheet ejection roller 62, and a spur 63 that is a sheet ejection roll. A sheet ejection tray 3 is provided below the sheet ejection roller 62.

A double-face unit 71 is detachably mounted on the back side of the apparatus body 1.

The double-face unit 71 retrieves the sheet 42 that is returned by the conveying belt 51 being rotated in the opposite direction, overturns the sheet, and feeds it again to between the counter roller 46 and the conveying belt 51.

The top portion of the double-face unit 71 is used as a manual feeding tray 72.

A maintenance/restoration mechanism 81 configured to maintain and restore the state of the nozzles of the print heads 34 is provided at a non-printing region at one side in the scanning direction of the carriage 33.

The maintenance/restoration mechanism 81 includes: cap members (hereinafter referred to as cap(s)) 82a and 82b (referred to as "cap(s) 82" when they are not distinguished) configured to cap each nozzle surface of the print head 34; a wiper member (wiper blade) 83 configured to wipe each nozzle surface; a blank shot receptacle 84 configured to receive liquid droplets when a blank shot for discharging liquid droplets that do not contribute to printing in order to discharge a thickened print liquid is performed; and a carriage lock 87 configured to lock the carriage 33.

In addition, at the downward side of the maintenance/restoration mechanism 81 of the head, a waste liquid tank 100 configured to house waste liquid generated by the maintenance/restoration operation is exchangeably mounted on the apparatus body.

A blank shot receptacle 88 configured to receive liquid droplets when a blank shot for discharging liquid droplets that do not contribute to printing in order to discharge a thickened print liquid during printing is performed is disposed at a non-printing region at the other side in the scanning direction of the carriage 33. The blank shot receptacle 88 includes openings 89 along the direction of the nozzle lines of the print heads 34.

In the liquid discharge apparatus configured as described above, the sheet 42 is fed one by one separately from the sheet feeding tray 202. The sheet 42 fed in an approximately vertical direction is guided by the guide member 45, and conveyed by being sandwiched between the conveying belt 51 and the counter roller 46. Then, the sheet 42 is shifted in the conveying direction by substantially 90°, with its leading end guided by the conveying guide 37 and pressed by the leading end pressurizing roll 49 onto the conveying belt 51.

At this time, so as to alternately repeat plus outputs and minus outputs, that is, alternated voltages are applied to the charging roller 56, and then the conveying belt 51 has an alternating electrically charged voltage pattern: i.e., plus and minus are alternately electrically charged at a predetermined width in a band shape in the sub-scanning direction that is the circumferential direction.

Then, when the sheet 42 is fed over the conveying belt 51 in which positive charges and negative charges are alternately electrically charged, the sheet 42 is adsorbed to the conveying belt 51 and is conveyed in the sub-scanning direction in accordance with the conveying belt 51 being rotated and moved.

Here, by the carriage 33 being moved to drive the print heads 34 in accordance with an image signal, ink droplets are discharged to print one line over the sheet 42 that is being stopped. After the sheet 42 is conveyed by a predetermined distance, the next line is printed on the sheet.

Upon reception of a printing completion signal or a signal indicating that the rear end of the sheet 42 arrives at the printing region, the printing operation is terminated, and the sheet 42 is ejected onto the sheet ejection tray 23.

When the nozzles of the print heads 34 are maintained and restored, the carriage 33 is moved to a position facing the maintenance/restoration mechanism 81 that is a home position, and capping is performed by the cap members 82. Then, the maintenance/restoration operations such as suction of the nozzles that performs suction from the nozzles and the blank shot for discharging liquid droplets that do not contribute to image formation are performed, which makes it possible to form an image with the liquid being stably discharged.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

The print medium is not limited to articles used as typical print media. It is suitable to use building materials such as wall paper, floor material, and tiles, cloth for apparel such as T-shirts, textile, and leather as the print medium. In addition, the configuration of the paths through which the print medium is transferred can be adjusted to accommodate ceramics, glass, metal, etc.

Moreover, image forming, recording, printing, etc. in the present disclosure represent the same meaning.

EXAMPLES

Examples of the present disclosure will be described below. However, it is construed that the present disclosure should not be limited to these Examples.

Preparation Example 1 of Curable Resin Composition

—Preparation of Curable Resin Composition (X-1)—

To a 500 mL-beaker, EP-4088L (80 parts by mass), EP-4100E (20 parts by mass), and PES (4 parts by mass) were added and were heated at 80 degrees C. for 48 hours. Then, the resultant was stirred with a spatula. It was visually confirmed that PES was uniformly dissolved. Then, TMMP (47 parts by mass), EGMP-4 (47 parts by mass), TC-750 (3 parts by mass), 1B2PZ (7 parts by mass), and KBM-603 (10 parts by mass) were added thereto and were stirred with a spatula at 25 degrees C. for 5 minutes. The resultant was transferred to a 500 mL-disposable cup and was stirred using a planetary stirring machine to obtain a curable resin composition (X-1).

Next, the curable resin composition (X-1) obtained was evaluated for curing ability, storage modulus, and adhesive property as described below. Results are presented in Table 1.

<Curing Ability>

The curable resin composition (X-1) (1 g) was placed on a SUS plate and then was stored for 4 hours in a thermostat bath that had been set to 60 degrees C. Then, it was confirmed by touching the curable resin composition (X-1) with a finger as to whether the curable resin composition (X-1) was cured. When the curable resin composition (X-1) uncured was not attached to the finger, it was judged as "OK". When the curable resin composition (X-1) uncured was attached to the finger, it was judged as "NG".

<Storage Modulus>

The curable resin composition (X-1) was charged into a mold that had been designed to have dimensions of height: 40 mm, width: 10 mm, and thickness: 0.5 mm and was cured for 4 hours in a thermostat bath of 80 degrees C. The curable resin composition (X-1) was measured with a dynamic viscoelasticity measuring device (RSA-G2, available from TA instruments) under the measurement conditions (−60 degrees C. through 200 degrees C., heating speed of 10 degrees C./minute, strain of 0.1%, and frequency of 1 Hz) and the obtained numerical values of storage modulus at 25 degrees C. were evaluated under the following criteria.

Regarding characteristics of the cured product of the curable resin composition, a certain degree of storage modulus is required because it affects, for example, adhesive strength. Meanwhile, when storage modulus is too high, stress relaxation ability after adhesion of members becomes worse. As a result, it is poor in a long-term reliability. Therefore, in the present disclosure, A or B was judged as "good evaluation" and C was judged as "bad evaluation".

[Evaluation Criteria]

A: The storage modulus is 5 MPa or more but less than 100 MPa.

B: The storage modulus is 100 MPa or more but less than 300 MPa.

C: The storage modulus is less than 5 MPa, or the storage modulus is 300 MPa or more.

<Adhesive Property>

The curable resin composition (X-1) was coated on a SUS plate so as to have a thickness of 10 μm. Then, a half of a Ni foil having a width of 10 mm was allowed to adhere to the composition, and the curable resin composition (X-1) was cured for 4 hours at 80 degrees C. Then, a universal bond tester 4000 plus (available from Nordson Advanced Technology K.K.) was used to perform the 90° peel test under the condition of a peeling speed of 0.2 mm/s. The adhesive strength was measured and adhesive property was evaluated under the following criteria. In the present disclosure, A or B was judged as "good evaluation" and C was judged as "bad evaluation" considering practical levels.

[Evaluation Criteria]

A: The adhesive strength is 0.2 N/cm or more.

B: The adhesive strength is 0.1 N/cm or more but less than 0.2 N/cm.

C: The adhesive strength is less than 0.1 N/cm.

Preparation Examples 2 to 12 of Curable Resin Compositions and Comparative Preparation Examples 1 to 5 of Curable Resin Compositions —Preparation of Curable Resin Compositions (X-2 to X-17)—

Each curable resin composition (X-2 to X-17) was obtained in the same manner as in Preparation Example 1 except that the formulation of Preparation Example 1 was changed to each formulation as presented in Table 1 to Table 3. Here, a unit of each component is part(s) by mass.

Each of the curable resin compositions obtained was evaluated for curing ability, storage modulus, and adhesive property in the same manner as in Preparation Example 1. Results are presented in Table 1 to Table 3.

TABLE 1

| | | Preparation Example | | | | | | | |
|---|---|---|---|---|---|---|---|---|---|
| | | 1 | 2 | 3 | 4 | 5 | 6 | 7 | 8 |
| A (Main agent) | EP-4088L | 80 | 80 | 80 | 80 | 80 | 80 | 80 | 80 |
| | EP-4010S | — | — | — | — | — | — | — | — |
| | ED-503G | — | — | — | — | — | — | — | — |
| | EP-3980S | — | — | — | — | — | — | — | — |
| | EP-4100E | 20 | 20 | 20 | 20 | 20 | 20 | 20 | 20 |
| | EP-1 | — | — | — | — | — | — | — | — |
| | jER-871 | — | — | — | — | — | — | — | — |
| B (Curing agent) | TMMP | 47 | 47 | 47 | 47 | 47 | 47 | 47 | 47 |
| | EGMP-4 | 47 | 47 | 47 | 47 | 47 | 47 | 47 | 47 |
| | T0429 | — | — | — | — | — | — | — | — |
| C (Additive resin) | PES-5003PS | 4 | 1 | 10 | 4 | 4 | 4 | 4 | — |
| | TC-750 | 3 | 3 | 3 | 1 | 10 | — | — | — |
| | TA-10 | — | — | — | — | — | 3 | — | 3 |
| D (Catalyst) | 1B2PZ | 7 | 7 | 7 | 7 | 7 | 7 | 7 | 7 |
| Other components | KBM-603 | 10 | 10 | 10 | 10 | 10 | 10 | 10 | 10 |
| | KBM-403 | — | — | — | — | — | — | — | — |
| | KBM-803 | — | — | — | — | — | — | — | — |
| | KBM-503 | — | — | — | — | — | — | — | — |
| | KBE-903 | — | — | — | — | — | — | — | — |
| Curable resin composition | | X-1 | X-2 | X-3 | X-4 | X-5 | X-6 | X-7 | X-8 |
| Evaluation results | Curing ability | OK | OK | OK | OK | OK | OK | OK | OK |
| | Storage modulus | A | A | B | A | B | A | A | B |
| | Adhesive property | B | B | A | B | A | B | B | B |
| Classification | Example of head | 1 | 1 | 1 | 1 | 1 | 1 | 1 | 1 |

TABLE 2

| | | Preparation Example | | | |
|---|---|---|---|---|---|
| | | 9 | 10 | 11 | 12 |
| A (Main agent) | EP-4088L | — | 60 | — | 30 |
| | EP-4010S | 80 | — | — | 45 |
| | ED-503G | — | 20 | — | 25 |
| | EP-3980S | — | — | 80 | — |
| | EP-4100E | 20 | 20 | 20 | — |
| | EP-1 | — | — | — | — |
| | jER-871 | — | — | — | — |
| B (Curing agent) | TMMP | 26 | 34 | 61 | 40 |
| | EGMP-4 | 26 | 34 | 61 | 40 |
| | T0429 | — | — | — | — |
| C (Additive resin) | PES-5003PS | 4 | 4 | — | 4 |
| | TC-750 | 3 | 3 | 3 | 3 |
| | TA-10 | — | — | — | — |
| D (Catalyst) | 1B2PZ | 7 | 7 | 7 | 7 |
| Other components | KBM-603 | 10 | 10 | 10 | 10 |
| | KBM-403 | — | — | — | — |
| | KBM-803 | — | — | — | — |
| | KBM-503 | — | — | — | — |
| | KBE-903 | — | — | — | — |
| Curable resin composition | | X-9 | X-10 | X-11 | X-12 |
| Evaluation results | Curing ability | OK | OK | OK | OK |
| | Storage modulus | B | B | B | A |
| | Adhesive property | A | A | A | A |
| Classification | Example of head | 1 | 2 | 1 | 3 |

TABLE 3

| | | Comparative Example | | | | |
|---|---|---|---|---|---|---|
| | | 1 | 2 | 3 | 4 | 5 |
| A (Main agent) | EP-4088L | 80 | 80 | 80 | 80 | — |
| | EP-4010S | — | — | — | — | — |
| | ED-503G | — | — | — | — | — |
| | EP-3980S | — | — | — | — | — |
| | EP-4100E | 20 | 20 | 20 | 20 | — |
| | EP-1 | — | — | — | — | 70 |
| | jER-871 | — | — | — | — | 30 |
| B (Curing agent) | TMMP | 47 | 47 | 47 | 47 | — |
| | EGMP-4 | 47 | 47 | 47 | 47 | — |
| | T0429 | — | — | — | — | 41 |
| C (Additive resin) | PES-5003PS | — | — | — | — | — |
| | TC-750 | — | — | — | — | — |
| | TA-10 | — | — | — | — | — |
| D (Catalyst) | 1B2PZ | 7 | 7 | 7 | 7 | 7 |
| Other components | KBM-603 | 10 | — | — | — | — |
| | KBM-403 | — | 10 | — | — | — |
| | KBM-803 | — | — | 10 | — | — |
| | KBM-503 | — | — | — | 10 | — |
| | KBE-903 | — | — | — | — | 10 |
| Curable resin composition | | X-13 | X-14 | X-15 | X-16 | X-17 |
| Evaluation results | Curing ability | OK | OK | OK | OK | OK |
| | Storage modulus | A | A | A | A | C |
| | Adhesive property | C | C | C | C | A |
| Classification | Example of head | — | — | — | — | — |

Details of the materials described in Tables 1 to 3 are as follows.

EP-4088L: Diglycidyl ether of dicyclopentadiene dimethanol, available from ADEKA Corporation, epoxy equivalent: 165 g/eq.

EP-4010S: Propylene oxide-modified epoxy resin of bisphenol A, available from ADEKA Corporation, epoxy equivalent: 350 g/eq.

ED-503G: Diglycidyl ether of 1,6-hexanediol, available from ADEKA Corporation, epoxy equivalent: 135 g/eq.

EP-3980S: Diglycidyl ether of orthotoluidine, available from ADEKA Corporation, epoxy equivalent: 115 g/eq.

EP-4100E: Bisphenol A type epoxy resin, available from ADEKA Corporation, epoxy equivalent: 190 g/eq.

EP-1: Bisphenol hexafluoroisopropyl glycidyl ether jER-871: Available from Mitsubishi Chemical Corporation, epoxy equivalent: 390 to 470 g/eq.

TMMP: Trimethylolpropane tris(3-mercaptopropionate), available from SC Organic Chemical Co., Ltd.

EGMP-4: Tetraethylene glycol bis(3-mercaptopropionate), available from SC Organic Chemical Co., Ltd.

T0429: Triethylenetetramine (N,N'-di(2-aminoethyl)eth-ylenediamine), available from Tokyo Chemical Industry Co., Ltd.

PES: SUMIKAEXCEL PES-5003PS, polyethersulfone, available from Sumitomo Chemical Company, Limited TC-750: Titanium diisopropoxybis(ethylacetoacetate), a compound where in the General Formula (2-1), $R^1$ is isopropyl, both b and c are 2, $R^2$ is a group represented by the General Formula (2-3), and $R^5$ is propyl, available from Matsumoto Fine Chemical Co., Ltd.

TA-10: Titanium tetraisopropoxide, a compound where in the General Formula (2-1), both $R^1$ and $R^2$ are isopropyl, and both b and c are 2, available from Matsumoto Fine Chemical Co., Ltd.

1B2PZ: 1-Benzyl-2-phenylimidazole, available from SHIKOKU CHEMICALS CORPORATION

SKBM-603: N-β-(aminoethyl)-γ-aminopropyltriethoxysilane, available from Shin-Etsu Chemical Co., Ltd.

KBM-403: γ-Glycidoxypropyltrimethoxysilane, available from Shin-Etsu Chemical Co., Ltd.

KBM-803: γ-Mercaptopropyltrimethoxysilane, available from Shin-Etsu Chemical Co., Ltd.

KBM-503: γ-Methacryloxypropyltrimethoxysilane, available from Shin-Etsu Chemical Co., Ltd.

KBE-903: γ-Aminopropyltriethoxysilane, available from Shin-Etsu Chemical Co., Ltd.

From the results in Table 1 to Table 3, it was found that all the curable resin compositions of Preparation Examples 1 to 12 have favorable curing ability at a low temperature, favorable storage modulus, and favorable adhesive property, and are excellent in ability as an adhesive agent. Particularly, the curable resin composition of Preparation Example 12 was excellent in all the evaluation items.

Meanwhile, the curable resin compositions of Comparative Preparation Examples 1 to 4 achieved no satisfactory results, particularly, in adhesive property. Moreover, the curable resin composition of Comparative Preparation Example 5 achieved no satisfactory result, particularly, in storage modulus.

Production Example 1 of Ink

—Preparation of Ink A—

Propylene glycol (30 parts by mass), diglycerin (5 parts by mass), naphthalenesulfonate (dispersant) (3 parts by mass), SURFYNOL 465 (surfactant) (2 parts by mass), PROXEL XL2 (preservative, available from Arch Chemicals) (0.1 parts by mass), and pure water (54.9 parts by mass) were mixed and were stirred for 15 minutes. Then, a disperse dye (Disperse Yellow 54) (5 parts by mass) was added thereto and was stirred for 30 minutes. The resultant was adjusted to pH 9 with triethanolamine and was further stirred for 30 minutes. After the stirring, the resultant was subjected to pressure filtration through a cellulose acetate membrane filter having an average pore diameter of 5.0 μm, and coarse particles were removed to prepare ink A.

Production Example 2 of Ink

—Preparation of Ink B—

Propylene glycol (25 parts by mass), SC-P1200 (polyoxypropylene diglyceryl ether, average molecular weight 1,200) (10 parts by mass), 2-pyrrolidone (3 parts by mass), SURFYNOL 440 (surfactant) (0.1 parts by mass), PROXEL XL2 (preservative, available from Arch Chemicals) (0.1 parts by mass), reactive dye (C.I. Reactive Blue 15:1) (8 parts by mass), tris (hydroxymethyl) aminomethane (0.5 parts by mass), and pure water (53.3 parts by mass) were mixed and were stirred for 60 minutes. After the stirring, the resultant was subjected to pressure filtration through a cellulose acetate membrane filter having an average pore diameter of 0.2 μm, and coarse particles were removed to prepare ink B.

Production Example 3 of Ink

—Preparation of Ink C—

A pigment (Pigment Blue 15:4) (20 parts by mass), a pigment dispersant (Solsperse 24000, available from The Lubrizol Corporation) (8 parts by mass), and isobornyl acrylate (72 parts by mass) were mixed and were dispersed with an EIGER mill (zirconia beads having a diameter of 0.5 mm as media were used) to obtain a pigment dispersion.

The pigment dispersion obtained (8 parts by mass), isobornyl acrylate (24 parts by mass), N-vinylcaprolactam (28 parts by mass), 2-phenoxyethyl acrylate (28 parts by mass), CN371 (REACTIVE AMINE COINITIATOR, available from SARTOMER) (4.5 parts by mass), tripropylene glycol diacrylate (1 part by mass), TPO (2,4,6-trimethylbenzoyl diphenyl phosphine oxide) (3 parts by mass), IRGACURE 819 (bis(2,4,6-trimethylbenzoyl)-phenylphosphine oxide, available from BASF) (3 parts by mass), and BYK-315 (silicone additive, available from BYK Chemie) (0.5 parts by mass) were mixed and were stirred for 60 minutes. After the stirring, the resultant was subjected to pressure filtration through a polyester filter having an average pore diameter of 5 μm, and coarse particles were removed to prepare ink C.

Production Example 4 of Ink

—Preparation of Ink D—

Irgalite blue GLVO (pigment) (30 parts by mass), Disperbyk 168 (dispersant) (20 parts by mass), and triethylene glycol divinyl ether (50 parts by mass) were mixed and were dispersed with an EIGER mill (zirconia beads having a diameter of 0.5 mm as media were used) to obtain a pigment dispersion.

The pigment dispersion obtained (6.4 parts by mass), γ-butyrolactone (20 parts by mass), diethylene glycol diethyl ether (60 parts by mass), pentaerythritol tetraacrylate (5 parts by mass), Irgacure 819 (phenylbis(2,4,6-trimethylbenzoyl)-phosphine oxide, available from BASF) (4 parts by mass), Irgacure 2959 (2-hydroxy-1-[4-(2-hydroxyethoxy)phenyl]-2-methyl-1-propanone, available from BASF) (4 parts by mass), Florstab UV 12 (stabilizer) (0.5 parts by mass), and BYK331 (silicone additive, available from BYK Chemie) (0.1 parts by mass) were mixed and were stirred for 60 minutes. After the stirring, the resultant was subjected to pressure filtration through a polyester filter having an average pore diameter of 5 μm, and coarse particles were removed to prepare ink D.

Production Example 5 of Ink

—Preparation of Ink E—

Disperbyk-111 (dispersant, available from BYK Chemie) (15 parts by mass) was added to ethylene glycol monobutyl ether acetate (50 parts by mass), and was dissolved through mixing. Then, LIONOL BLUE FG-7351 (pigment, available from TOYO INK CO., LTD.) (35 parts by mass) was added thereto, and was mixed under stirring. The resultant was dispersed with a horizontal-type sand mill for 4 hours to obtain a pigment dispersion.

The pigment dispersion obtained (14 parts by mass), ethylene glycol monobutyl ether acetate (43 parts by mass), propylene glycol monomethyl ether acetate (19 parts by mass), γ-butyrolactone (19 parts by mass), and vinyl resin VMCA (vinyl chloride acetate resin available from Dow Chemical) (5 parts by mass) were mixed and were stirred for 60 minutes. After the stirring, the resultant was subjected to pressure filtration through a polyester filter having an average pore diameter of 5 μm, and coarse particles were removed to prepare ink E.

Here, Table 4 summarizes the kind and classification of the inks.

TABLE 4

| No. | Name | Classification |
| --- | --- | --- |
| Production Example 1 | Ink A | Aqueous Ink |
| Production Example 2 | Ink B | |
| Production Example 3 | Ink C | Photopolymerizable ink |
| Production Example 4 | Ink D | |
| Production Example 5 | Ink E | Solvent ink |

Examples 1 to 3 and Comparative Example 1

<Preparation of Liquid Discharge Head>

In terms of physical properties after curing, the curable resin compositions in Tables 1 to 3 were classified as presented in the following Table 5. As a representative formulation of each classification, the curable resin compositions of Examples 1 to 3 (X-8, X-10, and X-12) and the curable resin composition of Comparative Preparation Example 5 (X-17) as the curable resin composition of Comparative Example 1 having large storage modulus were used in the resin layer 7. Then, the liquid discharge head presented in FIGS. 1 and 2 was produced in the routinely-used method.

TABLE 5

| | | Preparation Example | |
| --- | --- | --- | --- |
| No. | | Representative | Other |
| Example | 1 | X-8 | X-1-7, 9, 11 |
| | 2 | X-10 | — |
| | 3 | X-12 | — |
| Comparative Example | 1 | X-17 | — |

Next, each liquid discharge head produced was used to evaluate properties as described below. Results are presented in Table 6.

<Initial Discharging Property>

Evaluation was made as the discharging property of the liquid discharge head=initial discharging property. As a method for evaluating the initial discharging property, variation of the discharging speed of the discharged liquid droplets (150 channels in total) was evaluated in the following criteria. Specifically, an electric signal was input into the liquid discharge head filled with liquid for the discharge evaluation at a regular cycle (the order of microseconds) and the liquid droplets discharged at regular intervals were photographed. Each distance of the liquid droplets was calculated (image processing→length measurement) and the discharging speed of the liquid droplets was calculated based on the discharging speed of the liquid droplets= (distance between liquid droplets/cycle of electric signal). The above data of 150 channels were obtained and an average value and variation thereof were calculated. A rate of change (±%) with respect to the average value was determined and the initial discharging property was evaluated based on the following evaluation criteria. Note that, A or B was judged as good and C was judged as bad.

[Evaluation Criteria]
A: ±10% or less
B: ±15% or less
C: More than ±15%

<Head Deterioration Test>

With each ink being filled in the liquid discharge head, deterioration of the liquid discharge head due to each ink was accelerated under the environmental conditions of 70 degrees C. and a humidity of 80% RH to perform the head deterioration test. The inside of the liquid discharge head was washed every day, and then the above method for evaluating the initial discharging property was performed. At a point of time when the evaluation result of the discharging property was C, the liquid discharge head was disassembled and a broken part was confirmed.

—Evaluation of Head Durability—

Durability of the head was determined by determining a period of time for which results of both the initial discharging property of the liquid discharge head and the joint condition of the units were favorable, and was evaluated based on the following criteria. Here, A, B, and C were judged as good, and D and E were judged as bad.

[Evaluation Criteria]
A: Seven days or more
B: Five days or more but less than seven days
C: Three days or more but less than five days
D: One day or more but less than three days
E: Less than one day

TABLE 6

| | | Example 1 | Example 2 | Example 3 | Comparative Example 1 |
| --- | --- | --- | --- | --- | --- |
| Curable resin composition No. | | X-8 | X-10 | X-12 | X-17 |
| Evaluation results of curable resin composition | Curing ability | OK | OK | OK | OK |
| | Storage modulus | B | B | A | C |
| | Adhesive property | B | A | A | A |
| Evaluation results | Head charging property (initial discharging property) | B | B | A | A |
| | Head durability (Photopolymerizable ink) | D | B | A | E |
| | Head durability (Solvent ink) | C | B | A | E |
| | Head durability (Aqueous ink) | C | B | A | D |

*The result of head durability (aqueous ink) in Table 6 is worse result of the result of the ink A and the result of the ink B.
*The result of head durability (photopolymerizable ink) in Table 6 is worse result of the result of the ink C and the result of the ink D.

From the results of Table 6, it was found that the liquid discharge heads of Examples 1 to 3 using the curable resin composition of the present invention had favorable evaluation results of all the curing ability at a low temperature, the storage modulus, and the adhesive property, and were particularly excellent in the performance of the adhesive agent.

In addition, it was found that the liquid discharge heads of Examples 1 to 3 had favorable evaluation results of all the assembling property at a low temperature, the discharging property of the head, and the head durability with respect to various liquids, and particularly had such excellent performances that the discharging property and the head durability can be achieved.

Meanwhile, the liquid discharge head of Comparative Example 1 did not achieve satisfactory results of, particularly, the head durability.

Note that, the above Examples are described by way of Examples where the liquid discharge apparatus of the present disclosure was applied to a liquid discharge apparatus having a printer configuration, but are not limited thereto.

For example, the above Examples can be applied to liquid discharge apparatuses such as printer/fax/copy multifunction peripherals. In addition, it is also possible to apply it to liquid discharge apparatuses using liquid droplets other than inks.

Aspects of the present disclosure are as follows, for example.

<1> A liquid discharge head including:
a flow path formation part in which pressure generation chambers are arranged; and
a pressure generation unit configured to apply pressure to the pressure generation chambers,
wherein the pressure generation unit is formed by joining a vibration unit to the flow path formation part with a resin layer, and
wherein the resin layer includes a curable resin composition including (A) an epoxy resin, (B) a polythiol compound, (C) at least one adhesiveness-imparting agent selected from the group consisting of a compound represented by General Formula (1) below, a titanium compound represented by General Formula (2-1) below, and a titanium compound represented by General Formula (2-2) below, and (D) a curing accelerator,

[General Formula (1)]

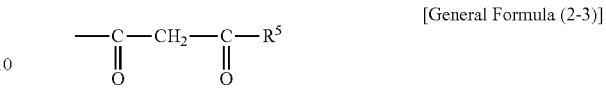

where in the General Formula (1), $X^1$, $X^2$, $X^3$, and $X^4$ each independently represent a single bond, O, S, $C(CH_3)_2$, CO, $CO_2$, or $SO_2$, $Y^1$ and $Y^2$ each independently represent H, Cl, or OH, and a represents an integer of from 1 through 10,000,

[General Formula (2-1)]

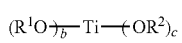

[General Formula (2-2)]

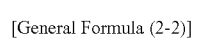

where in the General Formula (2-1) and the General Formula (2-2), $R^1$, $R^2$, $R^3$, and $R^4$ each independently represent an unsubstituted alkyl group having from 1 through 10 carbon atoms, an alkyl group having from 1 through 10 carbon atoms and substituted with a hydroxyl group, or a group represented by General Formula (2-3) below, b and c each independently represent an integer of from 1 through 3, and b+c=4,

[General Formula (2-3)]

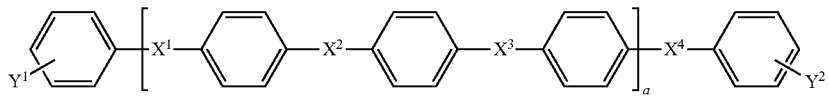

where in the General Formula (2-3), $R^5$ represents an alkyl group having from 1 through 6 carbon atoms.

<2> The liquid discharge head according to <1>, wherein (A) the epoxy resin is at least one selected from an alkylene oxide-modified epoxy resin of a polynuclear polyvalent phenol compound, diglycidyl ether of dicyclopentadiene dimethanol, and an epoxy compound containing a glycidylamino group.

<3> The liquid discharge head according to <1> or <2>, wherein (B) the polythiol compound is at least one selected from the group consisting of a thiol compound having two mercapto groups in a molecule thereof and a thiol compound having three or more mercapto groups in a molecule thereof.

<4> The liquid discharge head according to any one of <1> to <3>,
wherein the adhesiveness-imparting agent as the (C) is the compound represented by General Formula (1), and at least one selected from the group consisting of the titanium compound represented by General Formula (2-1) and the titanium compound represented by General Formula (2-2).

<5> The liquid discharge head according to any one of <1> to <4>,
wherein the compound represented by General Formula (1) is polyethersulfone.

<6> The liquid discharge head according to any one of <1> to <5>,
wherein (A) the epoxy resin includes at least one epoxy resin selected from the group consisting of (E) the alkylene oxide-modified epoxy resin of a polynuclear polyvalent phenol compound, (F) the diglycidyl ether of dicyclopentadiene dimethanol, and (G) the epoxy compound containing a glycidylamino group, and a content of the at least one epoxy resin is 10 parts by mass or more relative to a total content of (A) the epoxy resin of 100 parts by mass.

<7> The liquid discharge head according to any one of <1> to <6>,
wherein the resin layer includes a cured product obtained by curing the curable resin composition.

<8> The liquid discharge head according to any one of <1> to <7>,
wherein an average thickness of the resin layer is 2.5 μm or less.

<9> A method for producing a liquid discharge head including: a flow path formation part in which pressure generation chambers are arranged; and a pressure generation unit configured to apply pressure to the pressure generation chambers, the method including joining a vibration unit to the flow path formation part with a resin layer to form the pressure generation unit,
wherein the resin layer includes a curable resin composition including (A) an epoxy resin, (B) a polythiol compound, (C) at least one adhesiveness-imparting agent selected from the group consisting of a compound represented by General Formula (1) below, a titanium compound represented by General Formula (2-1) below, and a titanium compound represented by General Formula (2-2) below, and (D) a curing accelerator,

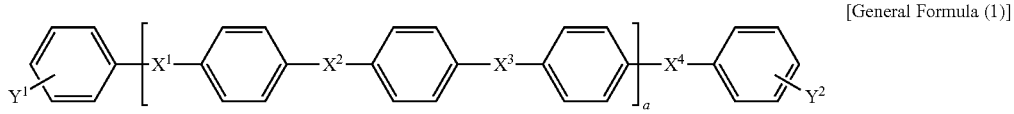

[General Formula (1)]

where in the General Formula (1), $X^1$, $X^2$, $X^3$, and $X^4$ each independently represent a single bond, O, S, $C(CH_3)_2$, CO, $CO_2$, or $SO_2$, $Y^1$ and $Y^2$ each independently represent H, Cl, or OH, and a represents an integer of from 1 through 10,000, $(R^1O)_{\overline{b}}-Ti-(OR^2)_c$

[General Formula (2-1)]

$(R^3O)_{\overline{3}}-Ti-O-Ti-(OR^4)_3$

[General Formula (2-2)]

where in the General Formula (2-1) and the General Formula (2-2), $R^1$, $R^2$, $R^3$, and $R^4$ each independently represent an unsubstituted alkyl group having from 1 through 10 carbon atoms, an alkyl group having from 1 through 10 carbon atoms and substituted with a hydroxyl group, or a group represented by General Formula (2-3) below, b and c each independently represent an integer of from 1 through 3, and b+c=4,

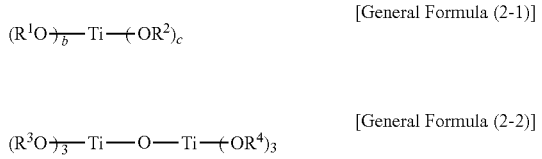

[General Formula (2-3)]

where in the General Formula (2-3), $R^5$ represents an alkyl group having from 1 through 6 carbon atoms.

<10> A liquid discharge apparatus including the liquid discharge head according to any one of <1> to <8>.

<11> An image forming apparatus including:
a housing unit configured to house an inkjet ink; and
a liquid discharge head configured to apply a stimulus to the inkjet ink to discharge the ink and print an image on a print medium,
wherein the liquid discharge head is the liquid discharge head according to any one of <1> to <8>.

<12> The image forming apparatus according to <10>, wherein the inkjet ink is at least one of an aqueous ink, a photopolymerizable ink, an oil-based ink, and a solvent ink.

The liquid discharge head according to any one of <1> to <8>, the method for producing the liquid discharge head according to <9>, the liquid discharge apparatus according to <10>, and the image forming apparatus according to <11> or <12> can solve the conventionally existing problems and can achieve the object of the present disclosure.

What is claimed is:

1. A liquid discharge head comprising:
a flow path formation part in which pressure generation chambers are arranged; and
a pressure generation unit configured to apply pressure to the pressure generation chambers,
wherein the pressure generation unit is formed by joining a vibration unit to the flow path formation part with a resin layer, and
wherein the resin layer includes a curable resin composition including (A) an epoxy resin, (B) a polythiol compound, (C) at least one adhesiveness-imparting agent selected from the group consisting of a compound represented by General Formula (1) below, a titanium compound represented by General Formula (2-1) below, and a titanium compound represented by General Formula (2-2) below, and (D) a curing accelerator,

[General Formula (1)]

where in the General Formula (1), $X^1$, $X^2$, $X^3$, and $X^4$ each independently represent a single bond, O, S, $C(CH_3)_2$, CO, $CO_2$, or $SO_2$, $Y^1$ and $Y^2$ each independently represent H, Cl, or OH, and a represents an integer of from 1 through 10,000, $(R^1O)_{\overline{b}}-Ti-(OR^2)_c$

[General Formula (2-1)]

$(R^3O)_{\overline{3}}-Ti-O-Ti-(OR^4)_3$

[General Formula (2-2)]

where in the General Formula (2-1) and the General Formula (2-2), $R^1$, $R^2$, $R^3$, and $R^4$ each independently represent an unsubstituted alkyl group having from 1 through 10 carbon atoms, an alkyl group having from 1 through 10 carbon atoms and substituted with a hydroxyl group, or a group represented by General Formula (2-3) below, b and c each independently represent an integer of from 1 through 3, and b+c=4,

[General Formula (2-3)]

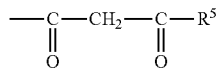

where in the General Formula (2-3), $R^5$ represents an alkyl group having from 1 through 6 carbon atoms.

2. The liquid discharge head according to claim 1, wherein (A) the epoxy resin is at least one selected from an alkylene oxide-modified epoxy resin of a polynuclear polyvalent phenol compound, diglycidyl ether of dicyclopentadiene dimethanol, and an epoxy compound containing a glycidylamino group.

3. The liquid discharge head according to claim 1, wherein (B) the polythiol compound is at least one selected from the group consisting of a thiol compound having two mercapto groups in a molecule thereof and a thiol compound having three or more mercapto groups in a molecule thereof.

4. The liquid discharge head according to according to claim 1, wherein the adhesiveness-imparting agent as the (C) is the compound represented by General Formula (1), and at least one selected from the group consisting of the titanium compound represented by General Formula (2-1) and the titanium compound represented by General Formula (2-2).

5. The liquid discharge head according to according to claim 1, wherein the compound represented by General Formula (1) is polyethersulfone.

6. The liquid discharge head according to according to claim 1, wherein (A) the epoxy resin includes at least one epoxy resin selected from the group consisting of (E) an alkylene oxide-modified epoxy resin of a polynuclear polyvalent phenol compound, (F) a diglycidyl ether of dicyclopentadiene dimethanol, and (G) an epoxy compound containing a glycidylamino group, and a content of the at least one epoxy resin is 10 parts by mass or more relative to a total content of (A) the epoxy resin of 100 parts by mass.

7. The liquid discharge head according to according to claim 1, wherein the resin layer includes a cured product obtained by curing the curable resin composition.

8. A method for producing a liquid discharge head including: a flow path formation part in which pressure generation chambers are arranged; and a pressure generation unit configured to apply pressure to the pressure generation chambers, the method comprising joining a vibration unit to the flow path formation part with a resin layer to form the pressure generation unit, wherein the resin layer includes a curable resin composition including (A) an epoxy resin, (B) a polythiol compound, (C) at least one adhesiveness-imparting agent selected from the group consisting of a compound represented by General Formula (1) below, a titanium compound represented by General Formula (2-1) below, and a titanium compound represented by General Formula (2-2) below, and (D) a curing accelerator,

[General Formula (1)]

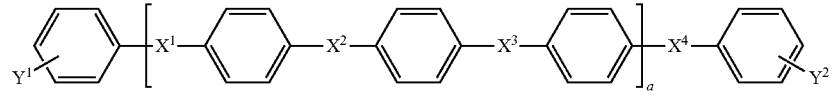

where in the General Formula (1), $X^1$, $X^2$, $X^3$, and $X^4$ each independently represent a single bond, O, S, $C(CH_3)_2$, CO, $CO_2$, or $SO_2$, $Y^1$ and $Y^2$ each independently represent H, Cl, or OH, and a represents an integer of from 1 through 10,000,

[General Formula (2-1)]

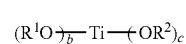

[General Formula (2-2)]

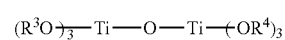

where in the General Formula (2-1) and the General Formula (2-2), $R^1$, $R^2$, $R^3$, and $R^4$ each independently represent an unsubstituted alkyl group having from 1 through 10 carbon atoms, an alkyl group having from 1 through 10 carbon atoms and substituted with a hydroxyl group, or a group represented by General Formula (2-3) below, b and c each independently represent an integer of from 1 through 3, and b+c=4,

[General Formula (2-3)]

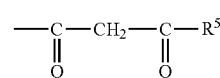

where in the General Formula (2-3), $R^5$ represents an alkyl group having from 1 through 6 carbon atoms.

9. A liquid discharge apparatus comprising the liquid discharge head according to claim 1.

10. An image forming apparatus comprising:
a housing unit configured to house an inkjet ink; and
a liquid discharge head configured to apply a stimulus to the inkjet ink to discharge the ink and print an image on a print medium,
wherein the liquid discharge head includes:
a flow path formation part in which pressure generation chambers are arranged; and
a pressure generation unit configured to apply pressure to the pressure generation chambers,
wherein the pressure generation unit is formed by joining a vibration unit to the flow path formation part with a resin layer, and
wherein the resin layer includes a curable resin composition including (A) an epoxy resin, (B) a polythiol compound, (C) at least one adhesiveness-imparting agent selected from the group consisting of a compound represented by General Formula (1) below, a titanium compound represented by General Formula (2-1) below, and a titanium compound represented by General Formula (2-2) below, and (D) a curing accelerator,

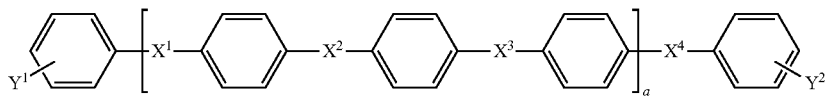

[General Formula (1)]

where in the General Formula (1), $X^1$, $X^2$, $X^3$, and $X^4$ each independently represent a single bond, O, S, $C(CH_3)_2$, CO, $CO_2$, or $SO_2$, $Y^1$ and $Y^2$ each independently represent H, Cl, or OH, and a represents an integer of from 1 through 10,000,

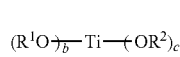

[General Formula (2-1)]

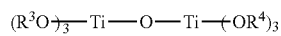

[General Formula (2-2)]

where in the General Formula (2-1) and the General Formula (2-2), $R^1$, $R^2$, $R^3$, and $R^4$ each independently represent an unsubstituted alkyl group having from 1 through 10 carbon atoms, an alkyl group having from 1 through 10 carbon atoms and substituted with a hydroxyl group, or a group represented by General Formula (2-3) below, b and c each independently represent an integer of from 1 through 3, and b+c=4,

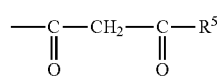

[General Formula (2-3)]

where in the General Formula (2-3), $R^5$ represents an alkyl group having from 1 through 6 carbon atoms.

* * * * *